(12) United States Patent
Chalmers et al.

(10) Patent No.: US 12,506,860 B2
(45) Date of Patent: Dec. 23, 2025

(54) CHANGING TINTING LEVELS OF ONE OR MORE DISPLAYS

(71) Applicant: Apple Inc., Cupertino, CA (US)

(72) Inventors: Devin W. Chalmers, Oakland, CA (US); Rahul Nair, Hayward, CA (US); Manuel C. Clement, Felton, CA (US); William D. Lindmeier, San Francisco, CA (US); Luis R. Deliz Centeno, Fremont, CA (US); Giancarlo Yerkes, San Francisco, CA (US); David H. Bloom, San Francisco, CA (US); Thomas S. Hulbert, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/040,692

(22) Filed: Jan. 29, 2025

(65) Prior Publication Data

US 2025/0260800 A1 Aug. 14, 2025

Related U.S. Application Data

(60) Provisional application No. 63/743,558, filed on Jan. 9, 2025, provisional application No. 63/552,068, filed on Feb. 9, 2024.

(51) Int. Cl.
*H04N 13/00* (2018.01)
*H04N 13/133* (2018.01)
(Continued)

(52) U.S. Cl.
CPC ......... *H04N 13/398* (2018.05); *H04N 13/133* (2018.05); *H04N 13/324* (2018.05);
(Continued)

(58) Field of Classification Search
CPC .......................... H04N 13/00; H04N 2013/00
See application file for complete search history.

(56) References Cited

U.S. PATENT DOCUMENTS 9,582,083 B2 2/2017 Yin
2013/0336629 A1 12/2013 Mulholland et al.
(Continued)

OTHER PUBLICATIONS

Yamada, et al., "VARiable HMD: Optical See-Through HMD for AR and VR", UIST '19 Adjunct, Oct. 20-23, 2019, Retrieved from the internet: <https://dl.acm.org/doi/pdf/10.1145/3332167.3356896>, pp. 131-133.

*Primary Examiner* — Maryam A Nasri
(74) *Attorney, Agent, or Firm* — Kubota & Basol LLP

(57) ABSTRACT

This relates generally to systems and methods for changing tinting levels of one or more displays, and more particularly to changing tinting levels of one or more displays of an electronic device based on the satisfaction of one or more criteria. In some examples, an electronic device (e.g., an HMD) presents content in a first manner including a first tint. In some examples, in response to determining that one or more criteria are satisfied, the electronic device presents the content in a second manner and changes the tinting level from the first tinting level to the second tinting level. Changing the tinting level and the presentation of the content allows a user to seamlessly see and/or focus on different objects in the physical environment without having to manually change the tint of the display and/or without having to manually change the presentation of the content presented on the display.

24 Claims, 20 Drawing Sheets

(51) Int. Cl.
*H04N 13/324* (2018.01)
*H04N 13/398* (2018.01)

(52) U.S. Cl.
CPC ............. *H04N 2013/0081* (2013.01); *H04N 2013/0085* (2013.01)

(56) References Cited

U.S. PATENT DOCUMENTS

| | | | |
|---|---|---|---|
| 2014/0085265 A1* | 3/2014 | Yin | G06F 3/0304 |
| | | | 250/208.2 |
| 2019/0025588 A1* | 1/2019 | Osterhout | H04N 13/383 |
| 2022/0152498 A1 | 5/2022 | Osman et al. | |
| 2023/0132156 A1 | 4/2023 | Chanchlani et al. | |

* cited by examiner

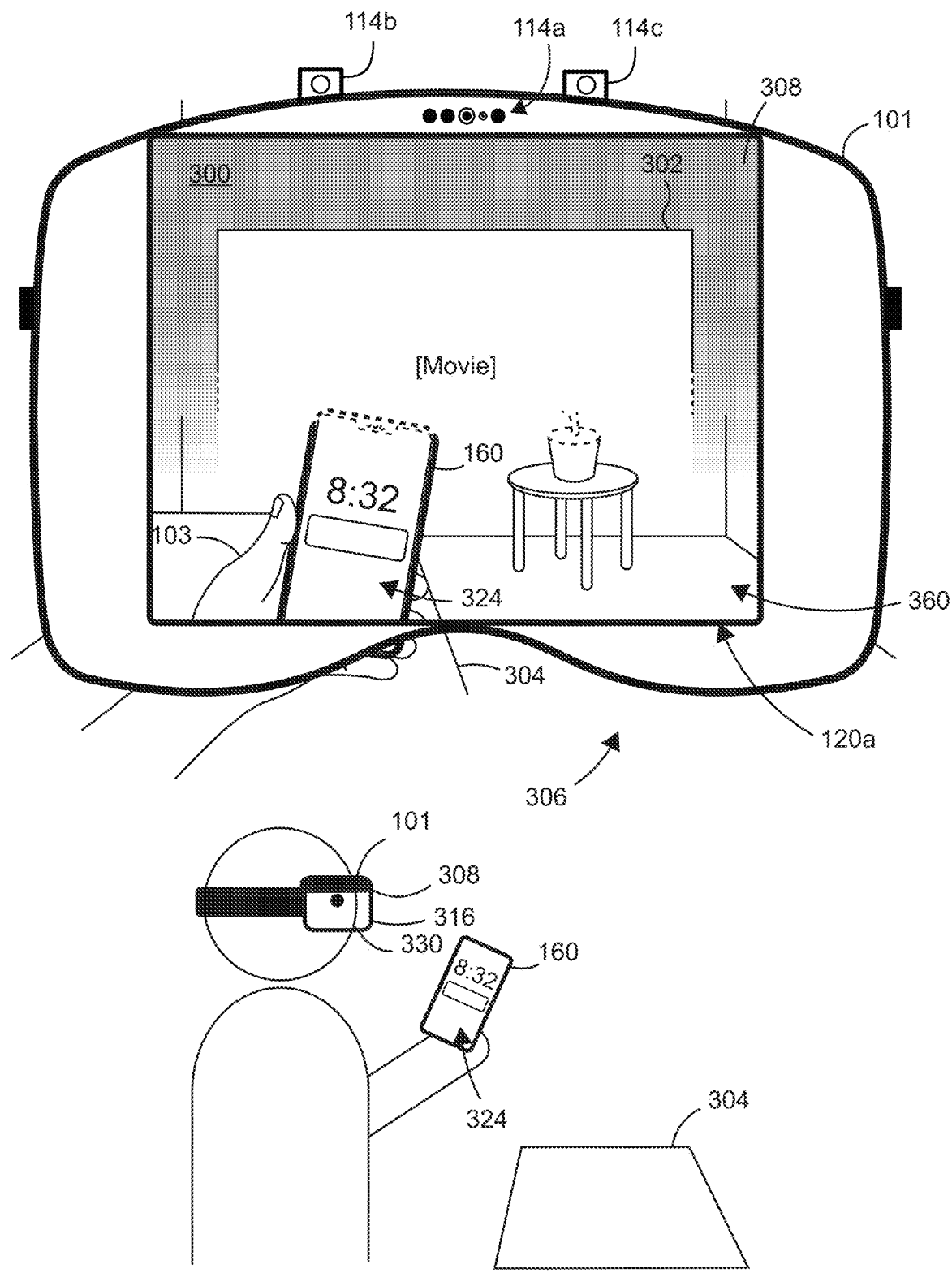
FIG. 3H-A

CHANGING TINTING LEVELS OF ONE OR MORE DISPLAYS

CROSS-REFERENCE TO RELATED APPLICATIONS

This application claims the benefit of U.S. Provisional Application No. 63/743,558, filed Jan. 9, 2025, and U.S. Provisional Application No. 63/552,068, filed Feb. 9, 2024, the contents of which are incorporated herein by reference in their entireties for all purposes.

FIELD OF THE DISCLOSURE

This relates generally to systems and methods of changing tinting levels of one or more displays, and more particularly to changing tinting levels of one or more displays of an electronic device based on the satisfaction of one or more criteria.

BACKGROUND OF THE DISCLOSURE

Some computer graphical environments provide two-dimensional and/or three-dimensional environments where at least some objects displayed for a user's viewing are virtual and generated by a computer. Users of head mounted displays (HMDs) often need to remove the HMDs or need to provide manual input to interact with the physical environment.

SUMMARY OF THE DISCLOSURE

This relates generally to systems and methods for changing tinting levels of one or more displays, and more particularly to changing tinting levels of one or more displays of an electronic device based on the satisfaction of one or more criteria. In some examples, an electronic device (e.g., an HMD) presents content in a first manner including a first tint. In some examples, in response to determining that one or more criteria are satisfied, the electronic device presents the content in a second manner and changes the tinting level from the first tinting level to the second tinting level. For example, in response to detecting that a user is directing attention away from a user interface displayed by the electronic device and is instead interacting with other objects (e.g., other electronic devices, people) in the physical environment, the electronic device reduces the tinting level (changes the tinting level of the display to be more transparent) and/or minimizes the content. Changing the tinting level and the presentation of the content allows a user to seamlessly see and/or focus on different objects in the physical environment without having to manually change the tint of the display and/or without having to manually change the presentation of the content presented on the display.

The full descriptions of these examples are provided in the Drawings and the Detailed Description, and it is understood that this Summary does not limit the scope of the disclosure in any way.

DETAILED DESCRIPTION

Figure 1:
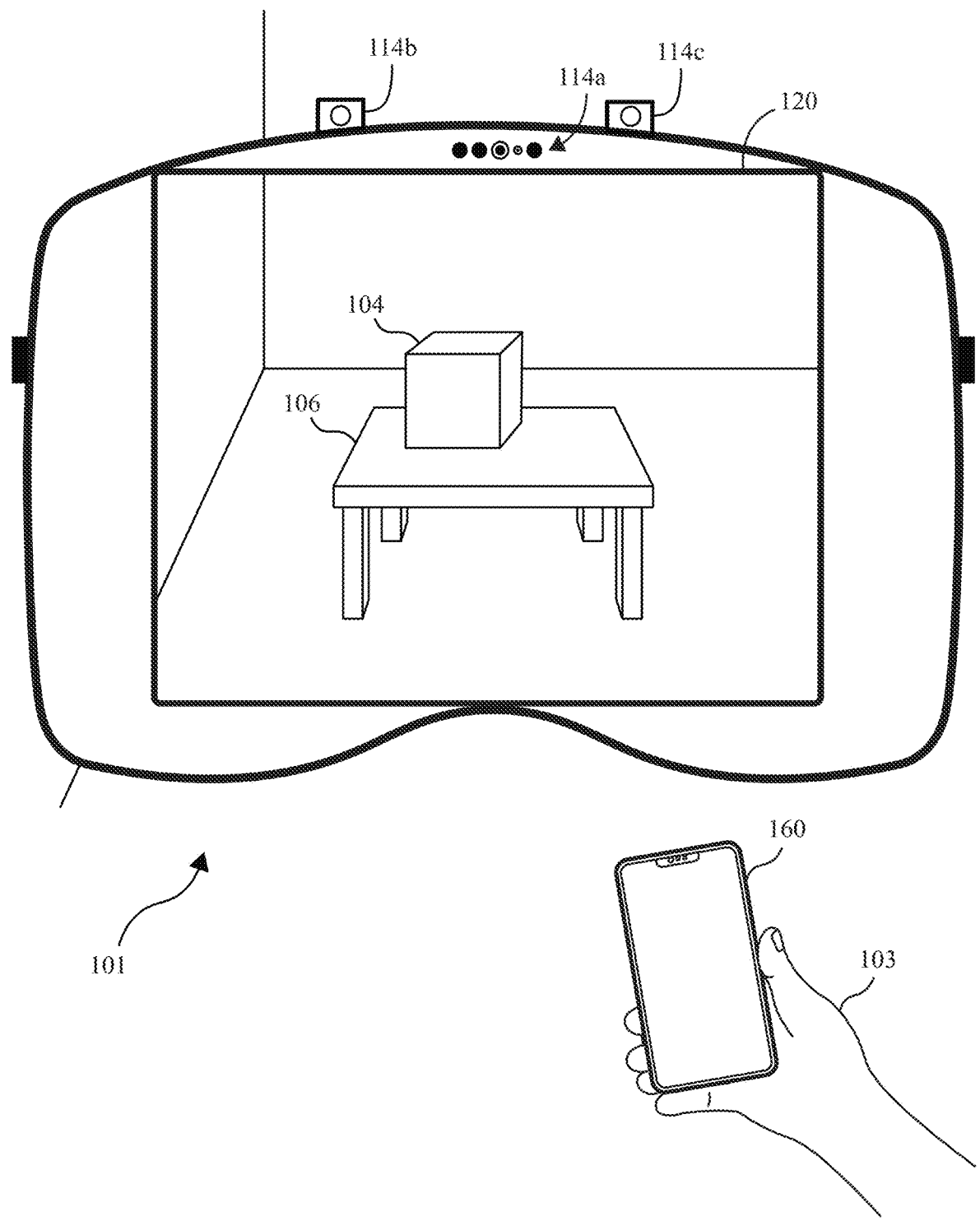
FIG. 1 illustrates an electronic device presenting an extended reality environment according to some examples of the disclosure.

This relates generally to systems and methods for changing tinting levels of one or more displays, and more particularly to changing tinting levels of one or more displays of an electronic device based on the satisfaction of one or more criteria. In some examples, an electronic device (e.g., an HMD) presents content in a first manner including a first tint. In some examples, in response to determining that one or more criteria are satisfied, the electronic device presents the content in a second manner and changes the tinting level from the first tinting level to the second tinting level. For example, in response to detecting that a user is directing attention away from a user interface displayed by the electronic device and is instead interacting with other objects (e.g., other electronic devices, people) in the physical environment, the electronic device reduces the tinting level (changes the tinting level of the display to be more transparent) and/or minimizes the content. Changing the tinting level and the presentation of the content allows a user to seamlessly see and/or focus on different objects in the physical environment without having to manually change the tint of the display and/or without having to manually change the presentation of the content presented on the display.

In some examples, presenting the extended reality environment with an electronic device includes presenting pass-through video of the physical environment of the electronic device. As described herein, for example, presenting pass-through video can include displaying virtual or video pass-through in which the electronic device uses one or more displays to display images of the physical environment. In other examples, presenting the extended reality environment with an electronic device includes presenting true or real optical see-through in which portions of the physical environment are visible to the user through a transparent portion of the display. As described herein, reducing the level of tint of the display enables improved viewing of the physical environment through the transparent portion of the display, whereas increasing the level of tint of the display enables improved presentation of some virtual content (e.g., obstructing some or all of the physical environment).

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

As used herein, an object that is displayed in a tilt-locked orientation in a three-dimensional environment (referred to herein as a tilt-locked object) has a distance offset relative to the user, such as a portion of the user's body (e.g., the user's torso) or the user's head. In some examples, a tilt-locked object is displayed at a fixed orientation relative to the three-dimensional environment. In some examples, a tilt-locked object moves according to a polar (e.g., spherical) coordinate system centered at a pole through the user (e.g., the user's head). For example, the tilt-locked object is moved in the three-dimensional environment based on movement of the user's head within a spherical space surrounding (e.g., centered at) the user's head. Accordingly, if the user tilts their head (e.g., upward or downward in the pitch direction) relative to gravity, the tilt-locked object would follow the head tilt and move radially along a sphere, such that the tilt-locked object is repositioned within the three-dimensional environment to be the same distance offset relative to the user as before the head tilt while optionally maintaining the same orientation relative to the three-dimensional environment. In some examples, if the user moves their head in the roll direction (e.g., clockwise or counterclockwise) relative to gravity, the tilt-locked object is not repositioned within the three-dimensional environment.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagram of FIG. 2A. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors 114a oriented towards a face of the user (e.g., eye tracking cameras described below with reference to FIGS. 2A-2B). In some examples, internal image sensors 114a are used for eye tracking (e.g., detecting a gaze of the user). Internal image sensors 114a are optionally arranged on the left and right portions of display 120a to enable eye tracking of the user's left and right eyes. In some examples, electronic device 101 also includes external image sensors 114b and 114c facing outwards from the user to detect and/or capture the physical environment of the electronic device 101 and/or movements of the user's hands or other body parts.

In some examples, display 120a has a field of view visible to the user (e.g., that may or may not correspond to a field of view of external image sensors 114b and 114c). Because display 120a is optionally part of a head-mounted device, the field of view of display 120a is optionally the same as or similar to the field of view of the user's eyes. In other examples, the field of view of display 120a may be smaller than the field of view of the user's eyes. In some examples, electronic device 101 may be an optical see-through device in which display 120a is a transparent or translucent display through which portions of the physical environment may be directly viewed. In some examples, display 120a may be included within a transparent lens and may overlap all or only a portion of the transparent lens. In other examples, electronic device may be a video-passthrough device in which display 120a is an opaque display configured to display images of the physical environment captured by external image sensors 114b and 114c. While a single display 120a is shown, it should be appreciated that display 120a may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120a of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, the electronic device 101 may be configured to communicate with a second electronic device, such as a companion device. For example, as illustrated in FIG. 1, the electronic device 101 may be in communication with electronic device 160. In some examples, the electronic device 160 corresponds to a mobile electronic device, such as a smartphone, a tablet computer, a smart watch, or other electronic device. Additional examples of electronic device 160 are described below with reference to the architecture block diagram of FIG. 2B. In some examples, the electronic device 101 and the electronic device 160 are associated with a same user. For example, in FIG. 1, the electronic device 101 may be positioned (e.g., mounted) on a head of a user and the electronic device 160 may be positioned near electronic device 101, such as in a hand 103 of the user (e.g., the hand 103 is holding of the electronic device 160), and the electronic device 101 and the electronic device 160 are associated with a same user account of the user (e.g., the user is logged into the user account on the electronic device 101 and the electronic device 160). Additional details regarding the communication between the electronic device 101 and the electronic device 160 are provided below with reference to FIGS. 2A-2B.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2A:
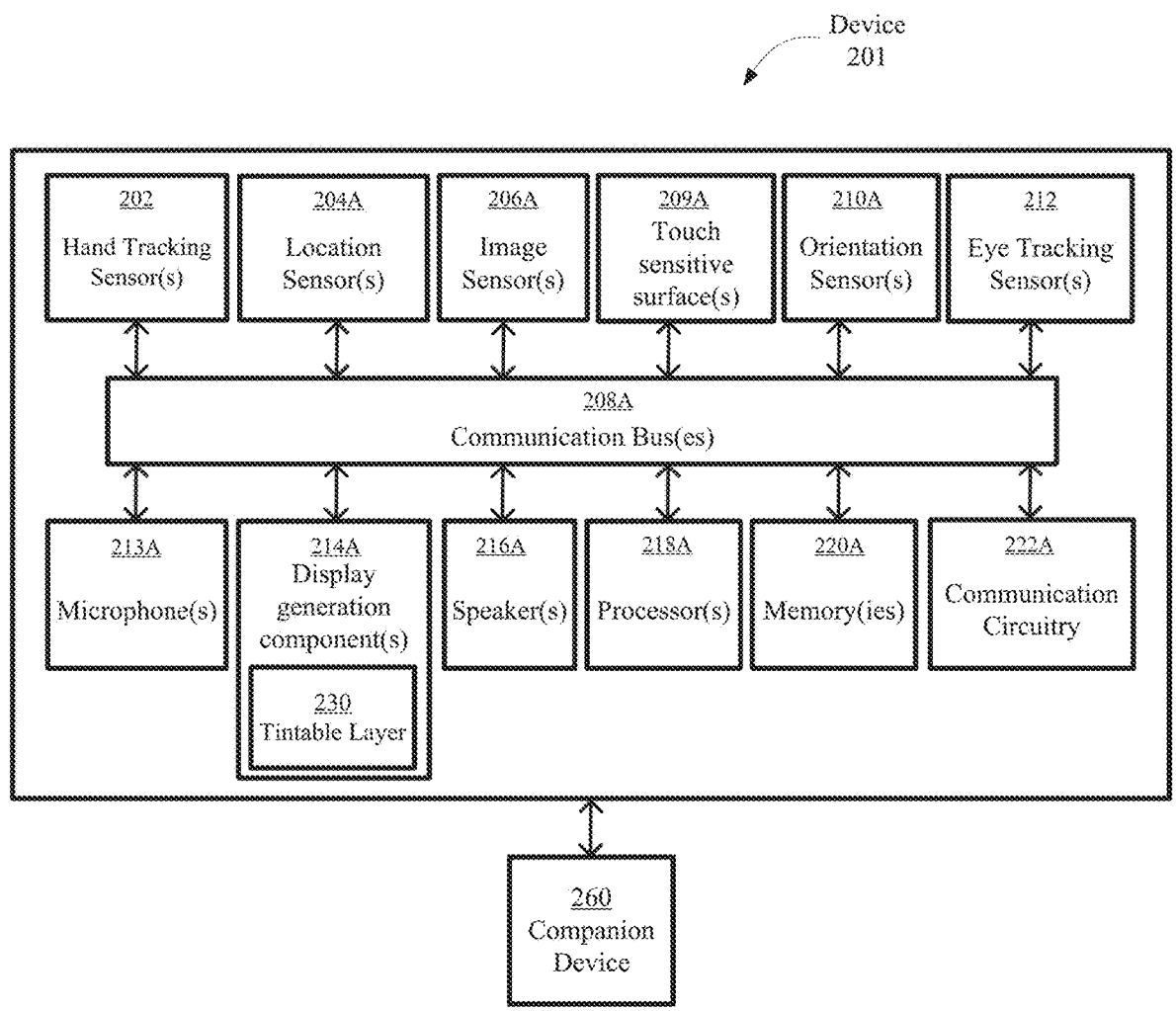
FIGS. 2A-2B illustrate block diagrams of example architectures for electronic devices according to some examples of the disclosure.
Figure 2B:
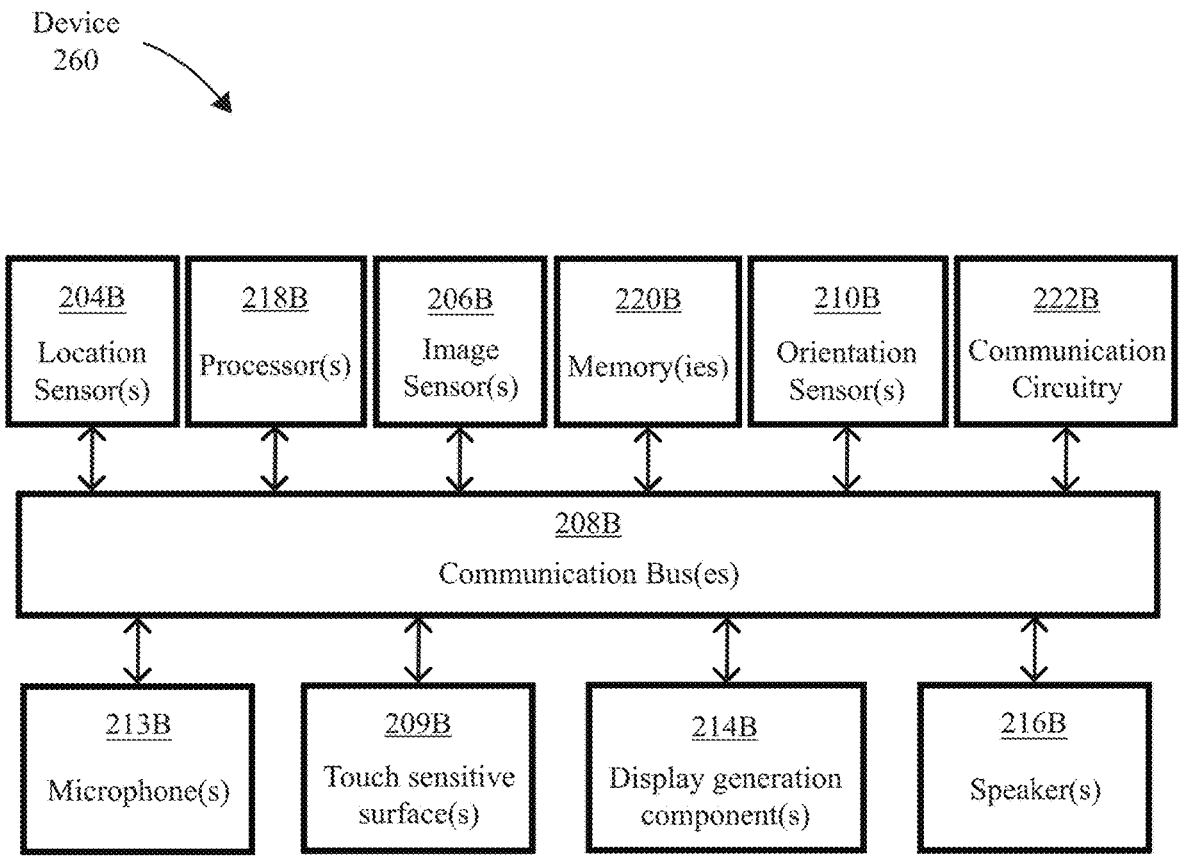

FIGS. 2A-2B illustrate block diagrams of example architectures for electronic devices 201 and 260 according to some examples of the disclosure. In some examples, electronic device 201 and/or electronic device 260 include one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1. In some examples, electronic device 260 corresponds to electronic device 160 described above with reference to FIG. 1.

As illustrated in FIG. 2A, the electronic device 201 optionally includes various sensors, such as one or more hand tracking sensors 202, one or more location sensors 204A, one or more image sensors 206A (optionally corresponding to internal image sensors 114a and/or external image sensors 114b and 114c in FIG. 1), one or more touch-sensitive surfaces 209A, one or more motion and/or orientation sensors 210A, one or more eye tracking sensors 212, one or more microphones 213A or other audio sensors, one or more body tracking sensors (e.g., torso and/or head tracking sensors), one or more display generation components 214A, optionally corresponding to display 120a in FIG. 1, one or more speakers 216A, one or more processors 218A, one or more memories 220A, and/or communication circuitry 222A. One or more communication buses 208A are optionally used for communication between the above-mentioned components of electronic devices 201. Additionally, as shown in FIG. 2B, the electronic device 260 optionally includes one or more location sensors 204B, one or more image sensors 206B, one or more touch-sensitive surfaces 209B, one or more orientation sensors 210B, one or more microphones 213B, one or more display generation components 214B, one or more speakers 216B, one or more processors 218B, one or more memories 220B, and/or communication circuitry 222B. One or more communication buses 208B are optionally used for communication between the above-mentioned components of electronic device 260. The electronic devices 201 and 260 are optionally configured to communicate via a wired or wireless connection (e.g., via communication circuitry 222A, 222B) between the two electronic devices. For example, as indicated in FIG. 2A, the electronic device 260 may function as a companion device to the electronic device 201.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some examples, memory 220A or 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some examples, memory 220A and/or 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214A, 214B include a single display (e.g., a liquid-crystal display (LCD), organic light-emitting diode (OLED), or other types of display). In some examples, display generation component(s) 214A, 214B includes multiple displays. In some examples, display generation component(s) 214A, 214B can include a display with touch capability (e.g., a touch screen), a projector, a holographic projector, a retinal projector, a transparent or translucent display, etc. In some examples, electronic devices 201 and 260 include touch-sensitive surface(s) 209A and 209B, respectively, for receiving user inputs, such as tap inputs and swipe inputs or other gestures. In some examples, display generation component(s) 214A, 214B and touch-sensitive surface(s) 209A, 209B form touch-sensitive display(s) (e.g., a touch screen integrated with each of electronic devices 201 and 260 or external to each of electronic devices 201 and 260 that is in communication with each of electronic devices 201 and 260). In some examples, the display generation component(s) 214A includes one or more tinting layers, as described in further detail in FIGS. 3A-3O. In some examples, the tinting layers are integrated into display generation component(s) 214A. In some examples, the tinting layers are separate layers in the display generation component(s) 214A. For example, and as shown in FIG. 2A, the display generation component(s) 214A includes a tintable layer 230.

Electronic devices 201 and 260 optionally includes image sensor(s) 206A and 206B, respectively. Image sensors(s) 206A, 206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A, 206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A, 206B also optionally include one or more cameras configured to capture movement of physical objects in the real-world environment. Image sensor(s) 206A, 206B also optionally include one or more depth sensors configured to detect the distance of physical objects from electronic device 201, 260. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201, 260 uses CCD sensors, event cameras, and depth sensors in combination to detect the physical environment around electronic device 201, 260. In some examples, image sensor(s) 206A, 206B include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201, 260 uses image sensor(s) 206A, 206B to detect the position and orientation of electronic device 201, 260 and/or display generation component(s) 214A, 214B in the real-world environment. For example, electronic device 201, 260 uses image sensor(s) 206A, 206B to track the position and orientation of display generation component(s) 214A, 214B relative to one or more fixed objects in the real-world environment.

In some examples, electronic devices 201 and 260 include microphone(s) 213A and 213B, respectively, or other audio sensors. Electronic device 201, 260 optionally uses microphone(s) 213A, 213B to detect sound from the user and/or the real-world environment of the user. In some examples, microphone(s) 213A, 213B includes an array of microphones (a plurality of microphones) that optionally operate in tandem, such as to identify ambient noise or to locate the source of sound in space of the real-world environment.

Electronic devices 201 and 260 include location sensor(s) 204A and 204B, respectively, for detecting a location of electronic device 201A and/or display generation component(s) 214A and a location of electronic device 260 and/or display generation component(s) 214B, respectively. For example, location sensor(s) 204A, 204B can include a global positioning system (GPS) receiver that receives data from one or more satellites and allows electronic device 201, 260 to determine the device's absolute position in the physical world.

Electronic devices 201 and 260 include orientation sensor(s) 210A and 210B, respectively, for detecting orientation and/or movement of electronic device 201 and/or display generation component(s) 214A and orientation and/or movement of electronic device 260 and/or display generation component(s) 214B, respectively. For example, electronic device 201, 260 uses orientation sensor(s) 210A, 210B to track changes in the position and/or orientation of electronic device 201, 260 and/or display generation component(s) 214A, 214B, such as with respect to physical objects in the real-world environment. Orientation sensor(s) 210A, 210B optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214A, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214A. In some examples, hand tracking sensor(s) 202 and/or eye tracking sensor(s) 212 are implemented together with the display generation component(s) 214A. In some examples, the hand tracking sensor(s) 202 and/or eye tracking sensor(s) 212 are implemented separate from the display generation component(s) 214A. In some examples, electronic device 201 alternatively does not include hand tracking sensor(s) 202 and/or eye tracking sensor(s) 212. In some such examples, the display generation component(s) 214A may be utilized by the electronic device 260 to provide an extended reality environment and utilize input and other data gathered via the other sensor(s) (e.g., the one or more location sensors 204A, one or more image sensors 206A, one or more touch-sensitive surfaces 209A, one or more motion and/or orientation sensors 210A, and/or one or more microphones 213A or other audio sensors) of the electronic device 201 as input and data that is processed by the processor(s) 218B of the electronic device 260. Additionally or alternatively, electronic device 201 optionally does not include other components shown in FIG. 2B, such as location sensors 204B, image sensors 206B, and/or touch-sensitive surfaces 209B, etc. In some such examples, the display generation component(s) 214A may be utilized by the electronic device 260 to provide an extended reality environment and the electronic device 260 may utilize input and other data gathered via the one or more motion and/or orientation sensors 210A (and/or one or more microphones 213A) of the electronic device 201 as input.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206A are positioned relative to the user to define a field of view of the image sensor(s) 206A and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic devices 201 and 260 are not limited to the components and configuration of FIGS. 2A-2B, but can include fewer, other, or additional components in multiple configurations. In some examples, electronic device 201 and/or electronic device 260 can each be implemented between multiple electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201 and/or electronic device 260, is optionally referred to herein as a user or users of the device.

Attention is now directed towards an electronic device (e.g., corresponding to electronic device 201 and/or electronic device 101) that includes one or more tintable displays. In some examples, an electronic device applies a first tint to the display while presenting content in a first manner. In some examples, a user may want to use and/or interact with a second electronic device, which is communicatively connected to the electronic device. The second electronic device and/or other electronic devices may transmit an indication to the electronic device indicating that the user is no longer looking at the content or is otherwise an indication that the user of the electronic device wishes to direct attention to something other than the content. As a result, the electronic device presents the content in a second manner and applies a second tint, different from the first tint, to the display to allow the user to better view the second electronic device. The electronic device may use the one or more criteria described below to determine when to present the content in the second manner and when to change the tint from the first tint to the second tint, as discussed with reference to FIGS. 3A-3O.

In some examples, the electronic device may determine, or receive an indication from one or more different electronic devices indicating, that the user is interacting or intends to interact with a person and/or object in their physical environment different than the content presented on the electronic device. For example, the one or more electronic devices may include microphones, mobile phones, and/or smart watches. In some examples, the electronic device uses one or more sensors in communication with the electronic device (e.g., an inertial measurement unit (IMU) sensor) to determine if the user is interacting or intends to interact with the physical environment.

The techniques described herein provide for an improved user experience. For example, the methods and systems described herein provide seamless transitions between virtual content experiences and interactions with the physical environment with limited or no express user input. For example, the electronic device automatically presents content in different manners based whether the one or more criteria are satisfied. Additionally, the electronic device automatically transitions the display(s) from the first tinting level to the second tinting level based on whether the one or more criteria are satisfied.

Figure 3A:
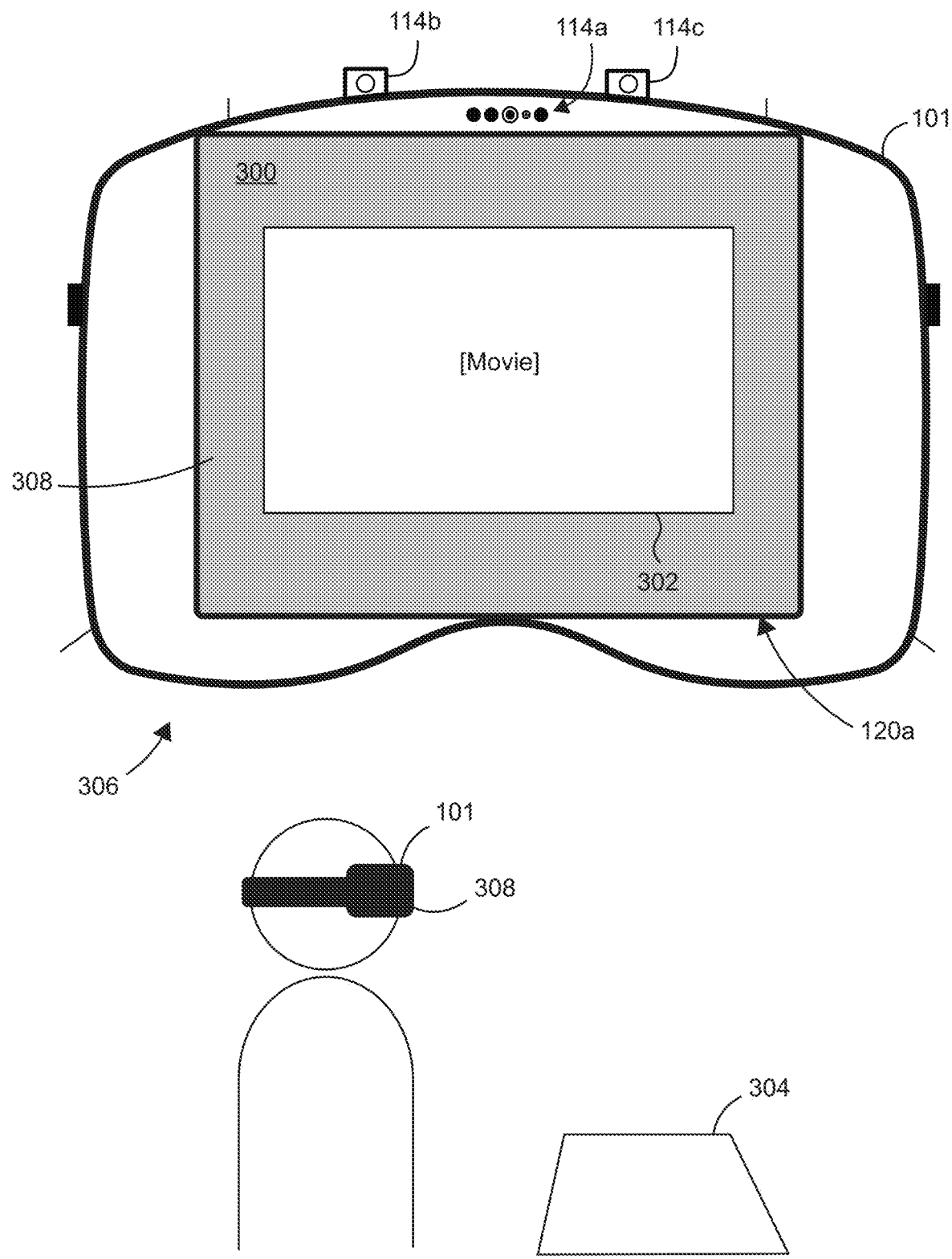
FIGS. 3A-3O illustrate examples of an electronic device presenting content differently and changing tinting levels of displays once one or more criteria are satisfied according to some examples of the disclosure.
Figure 3B:
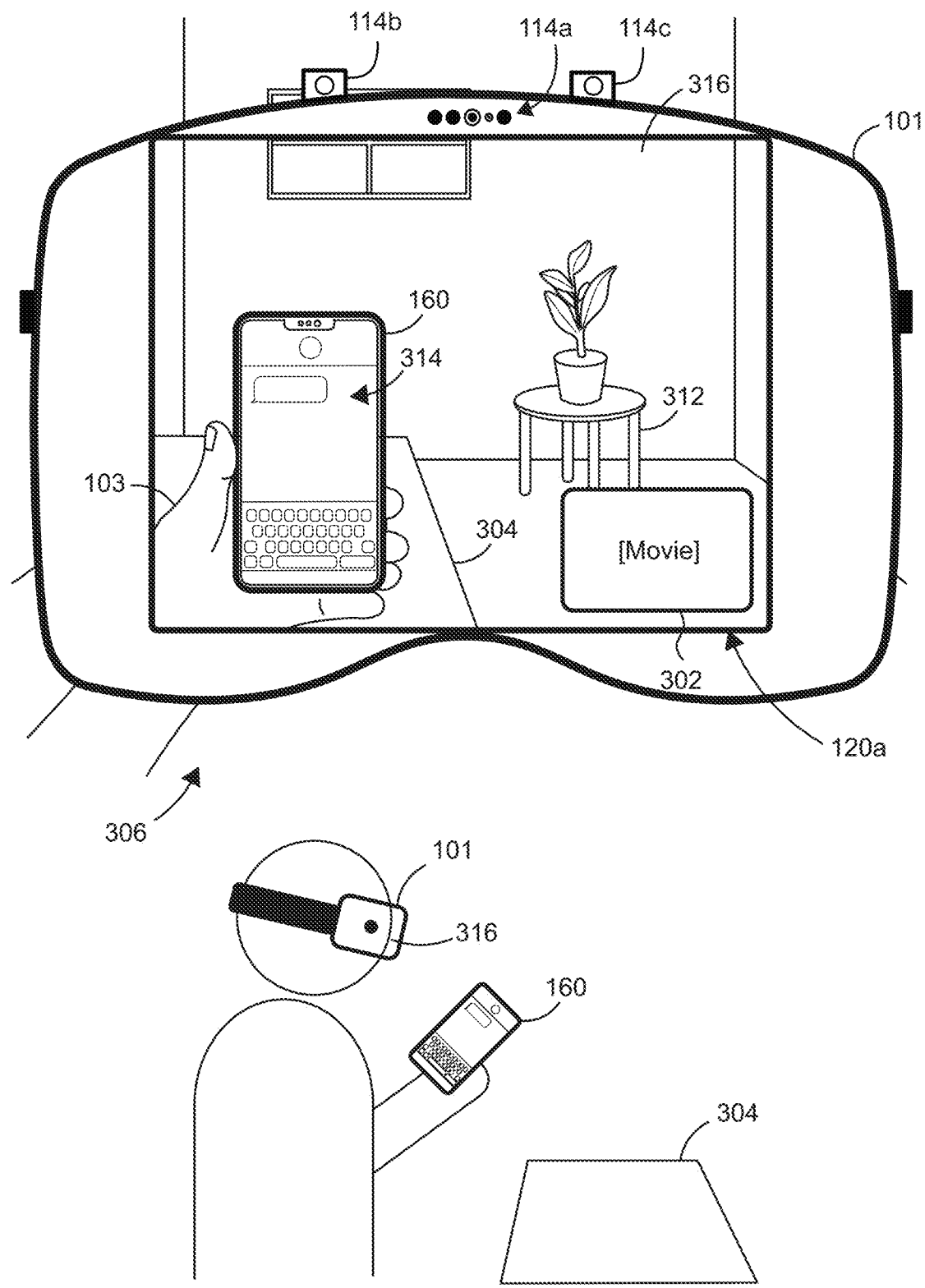
Figure 3C:
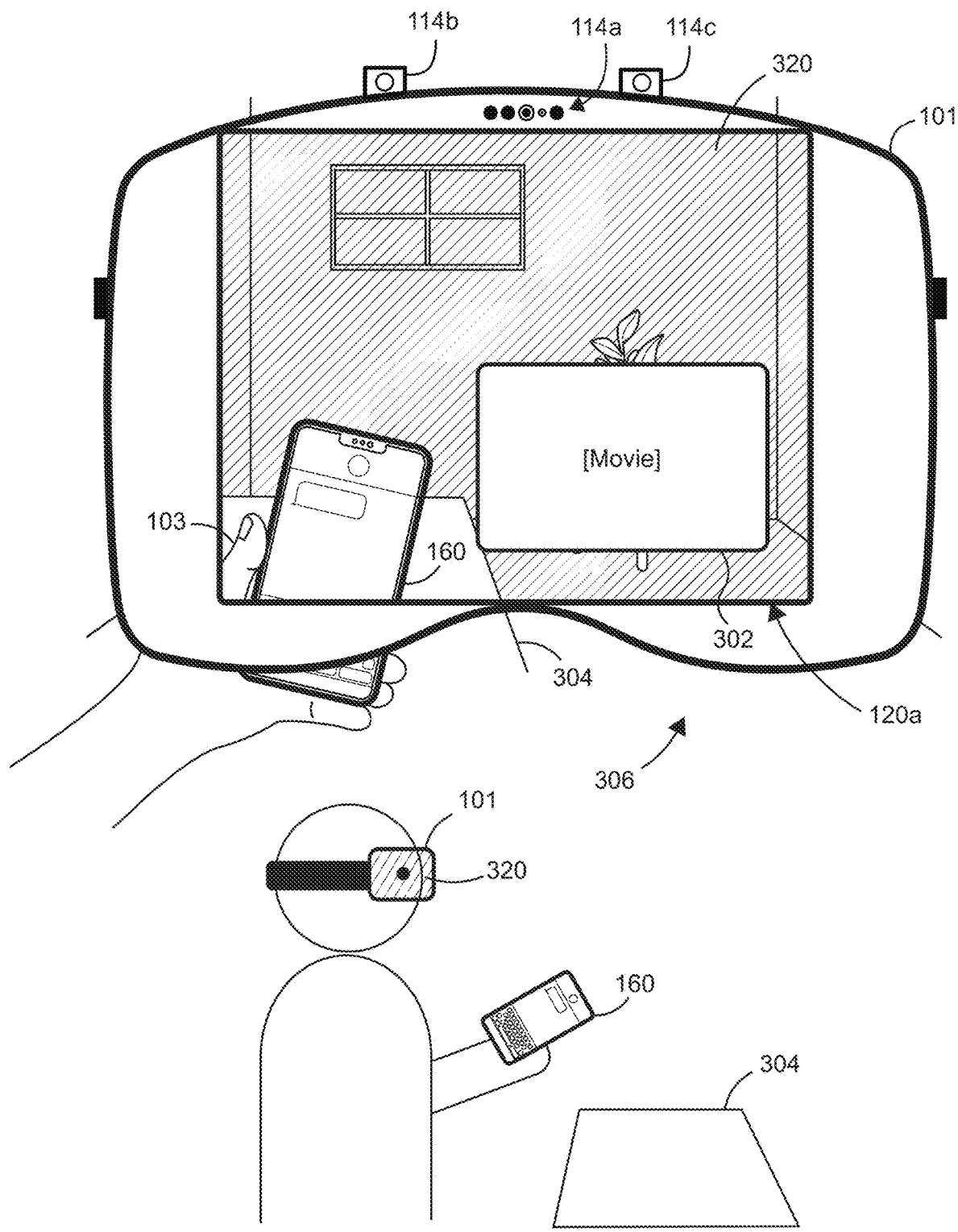
Figure 3D:
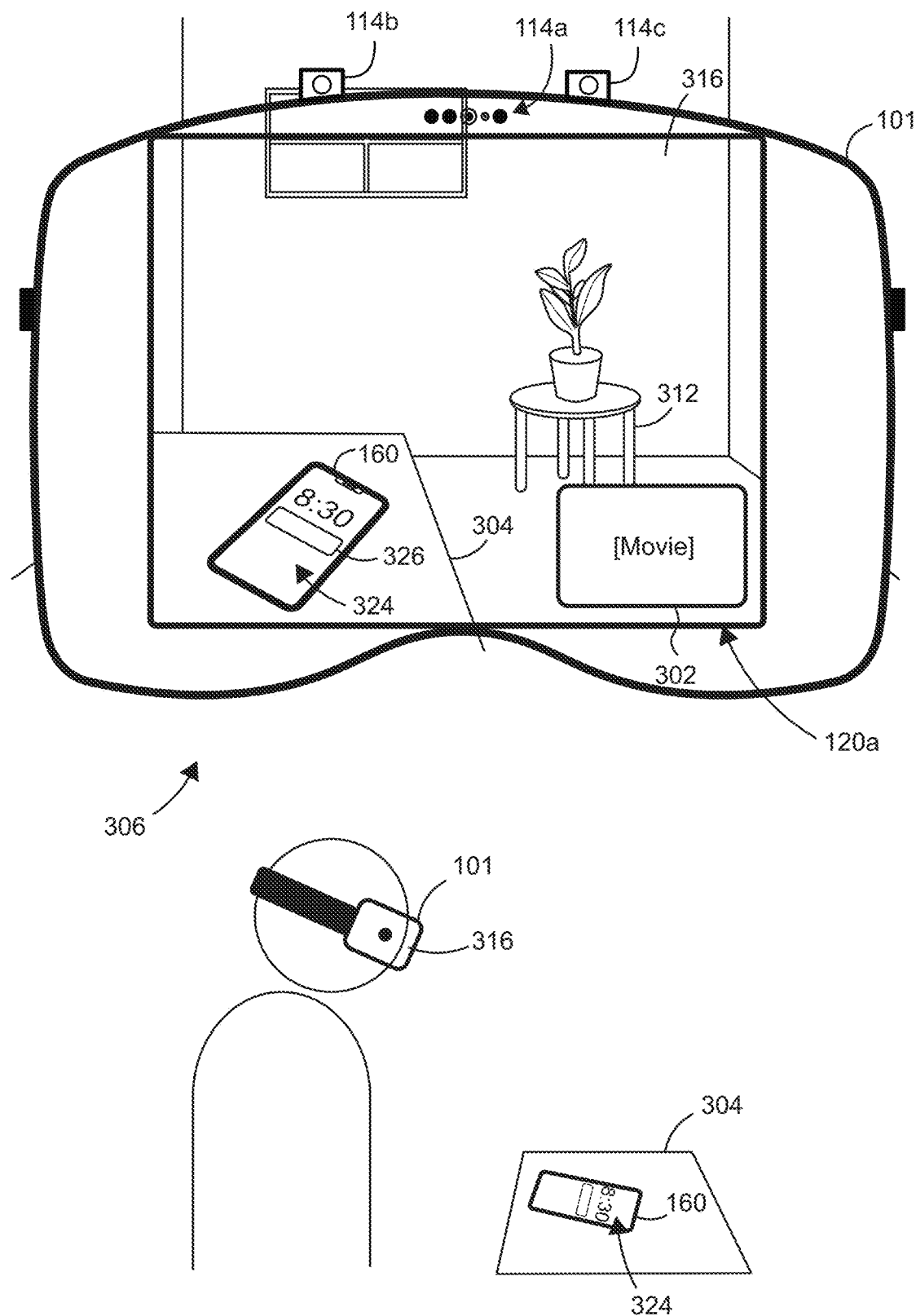
Figure 3E:
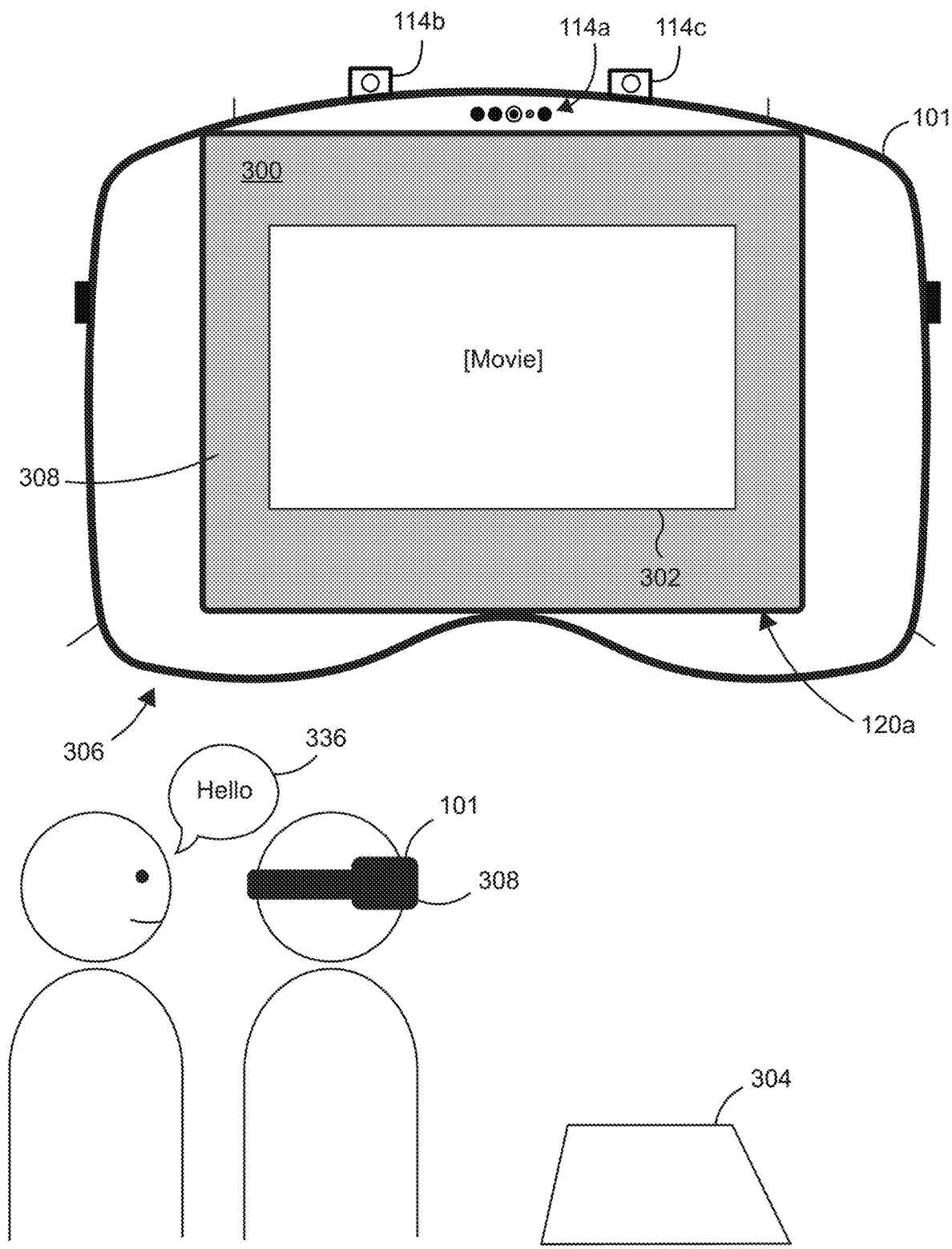
Figure 3F:
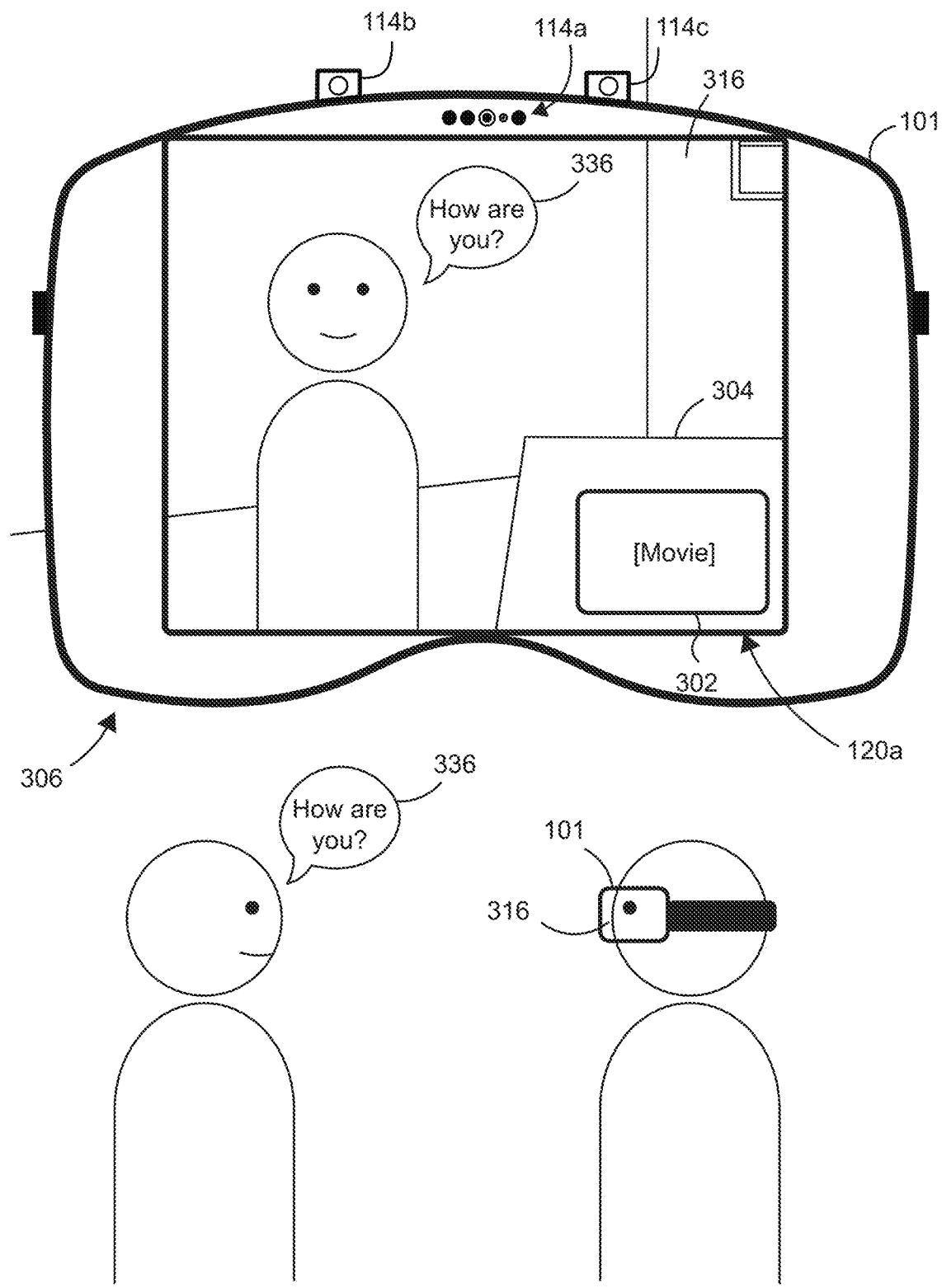
Figure 3G:
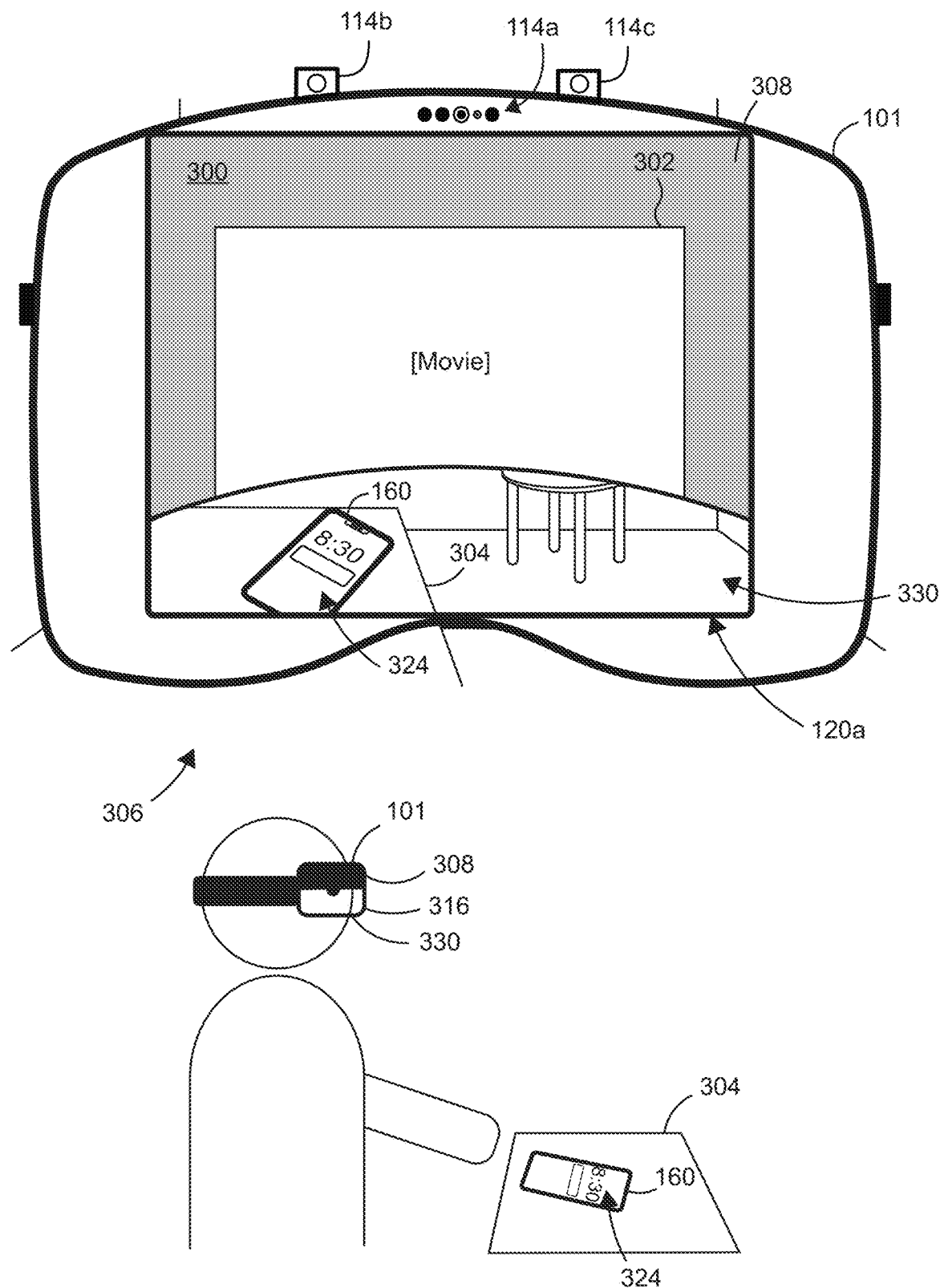
Figure 3H:
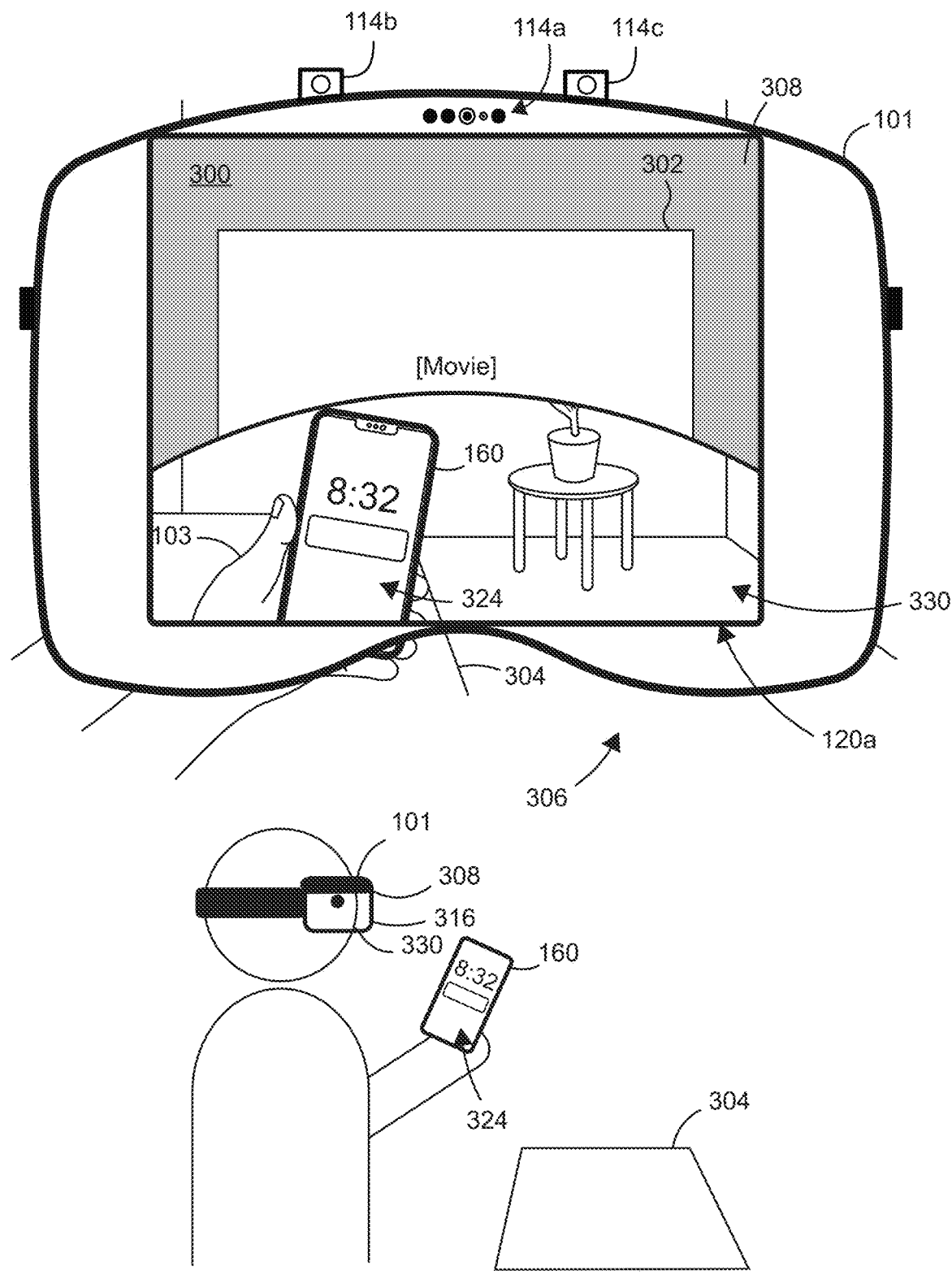
Figure 3I:
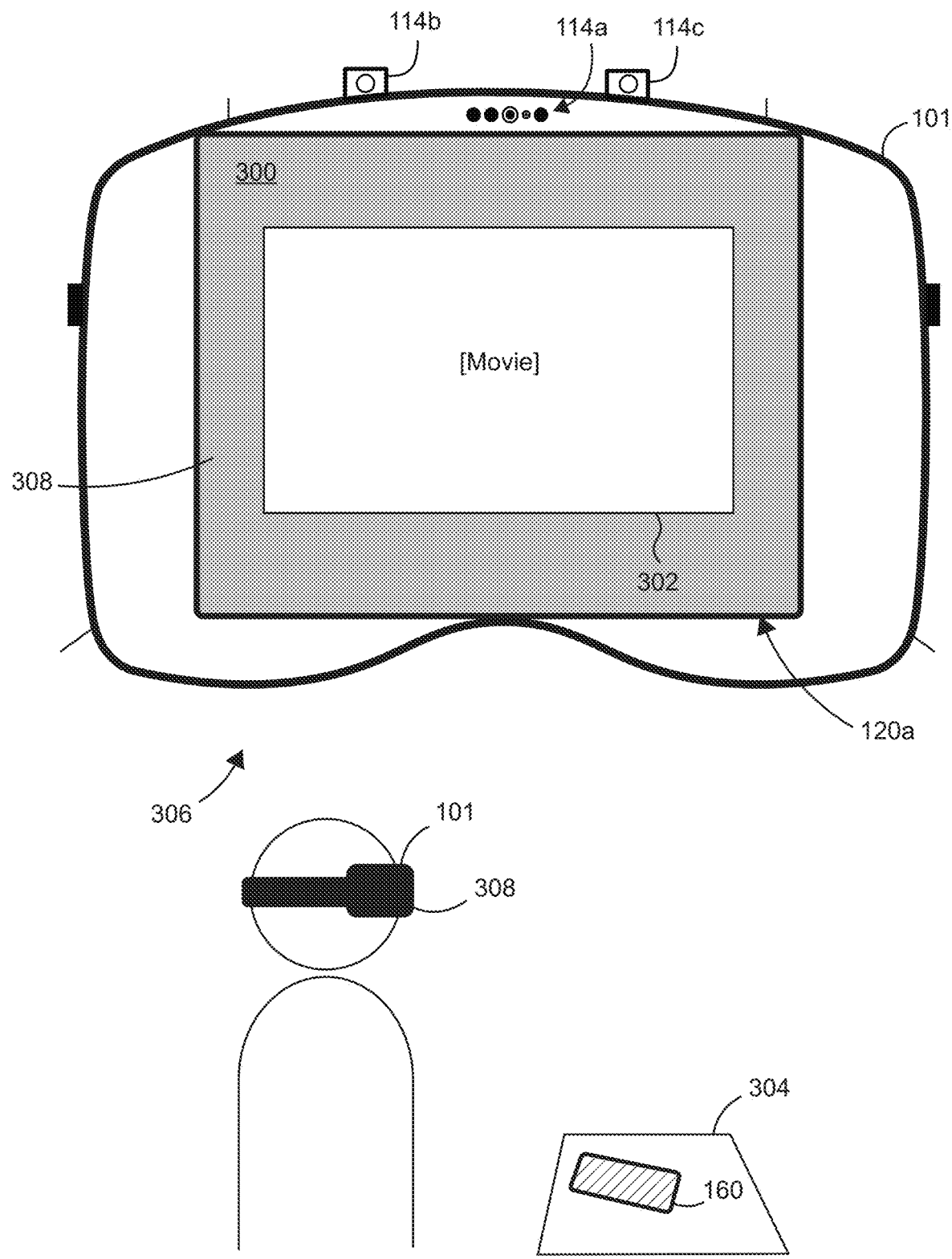
Figure 3J:
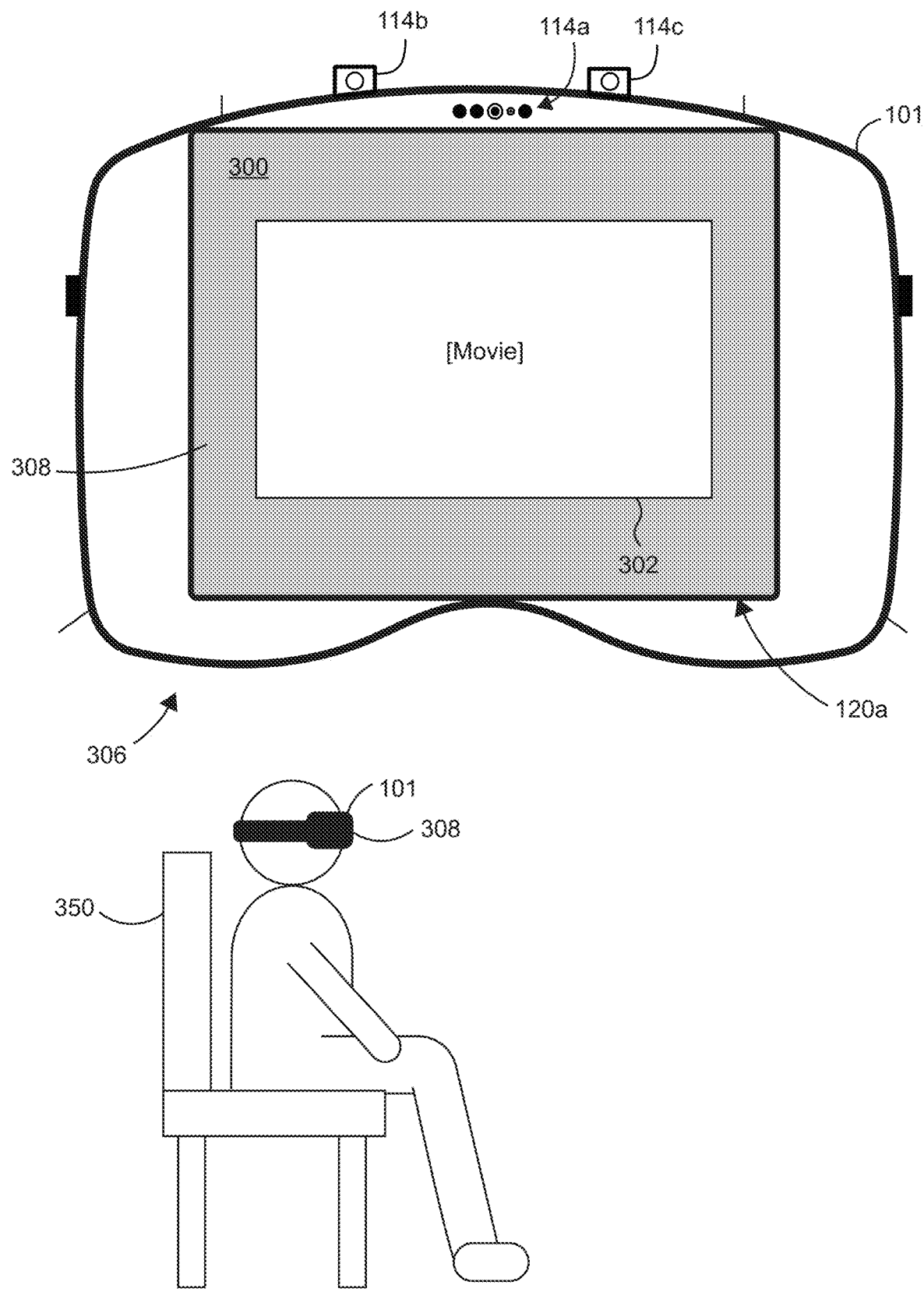
Figure 3K:
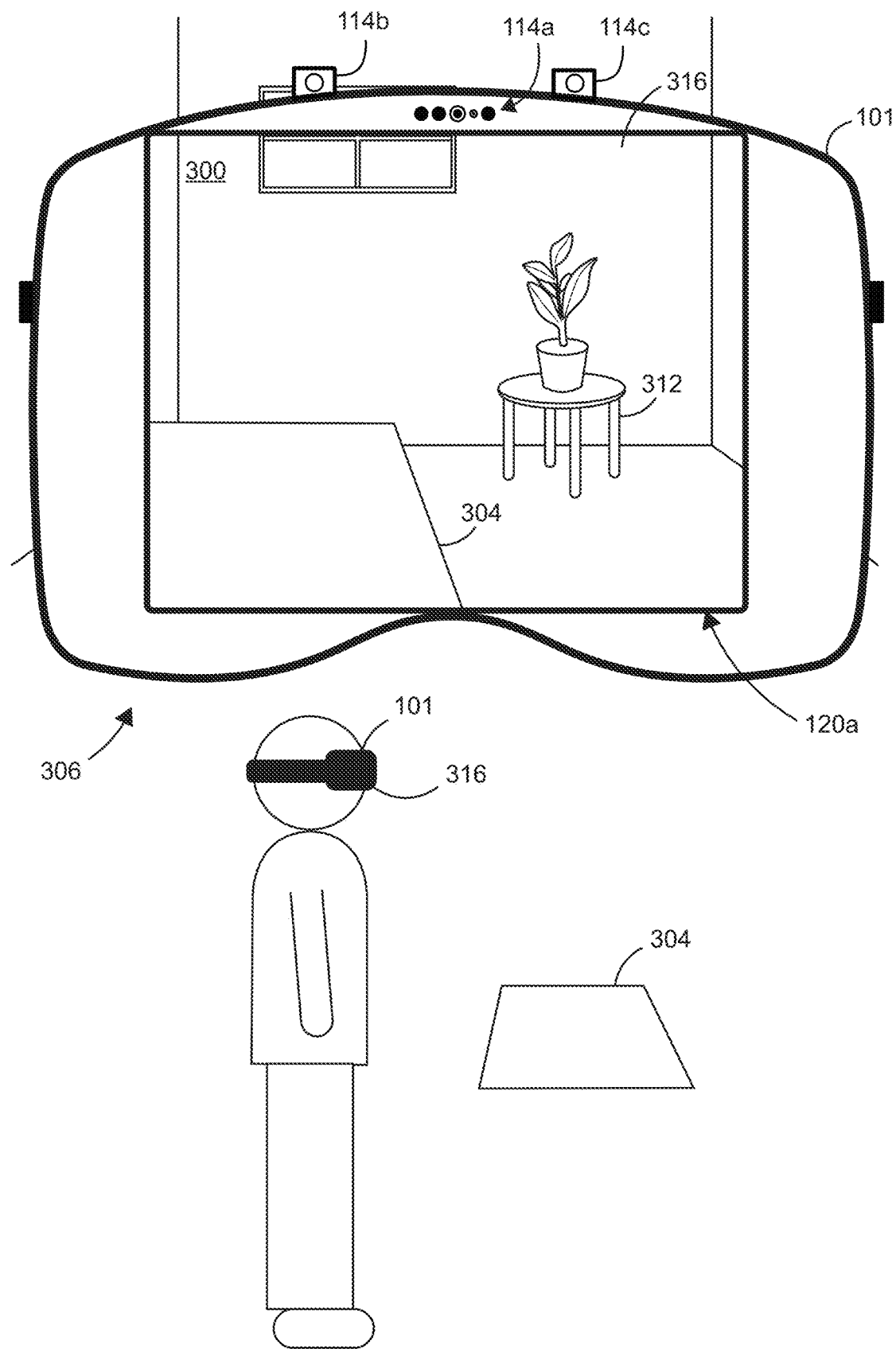
Figure 3L:
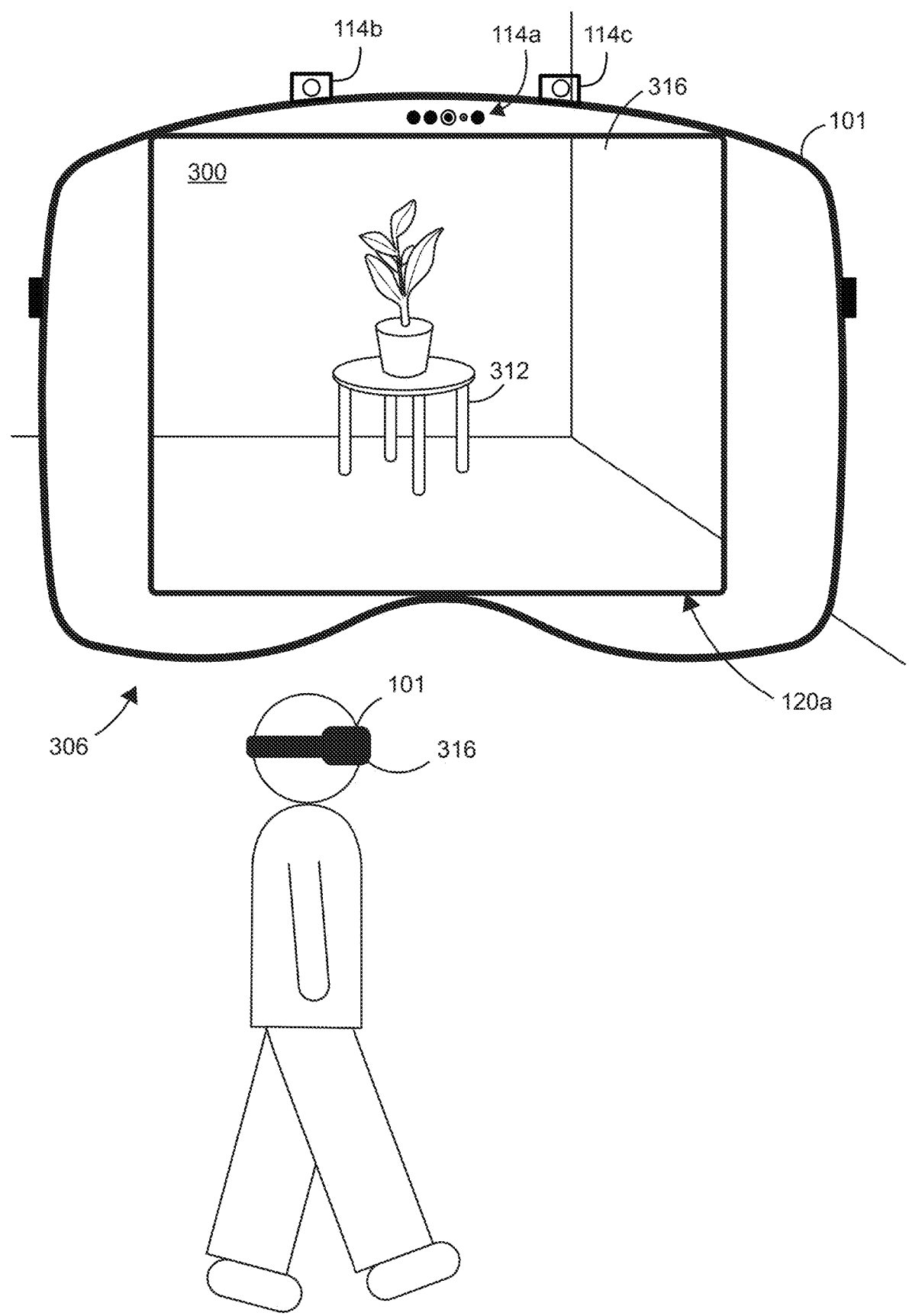
Figure 3M:
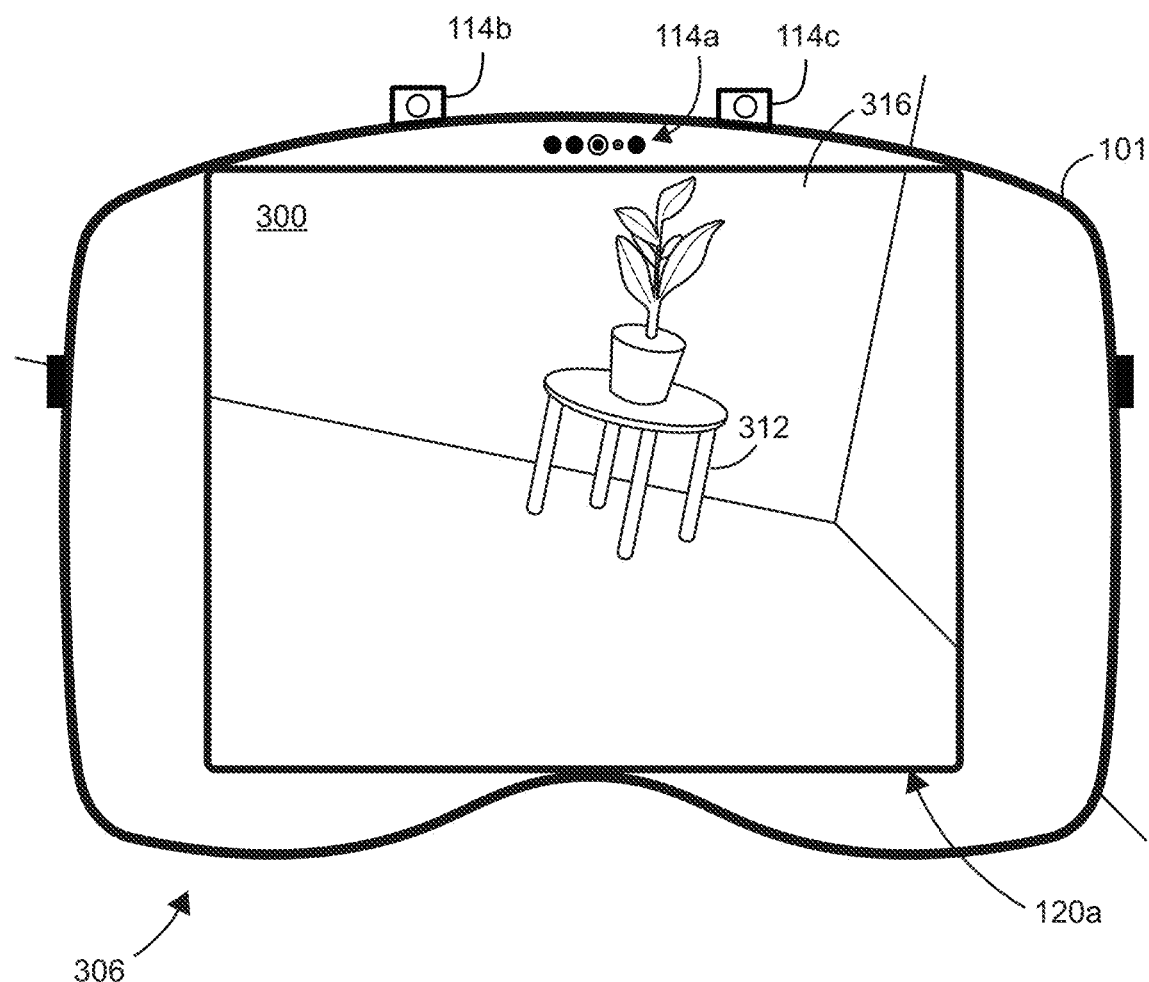
Figure 3M:
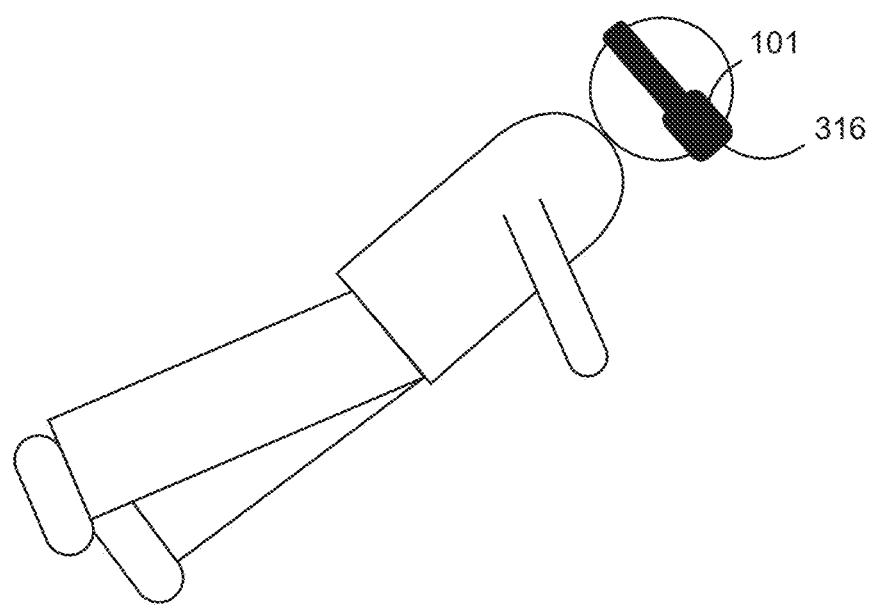
Figure 3N:
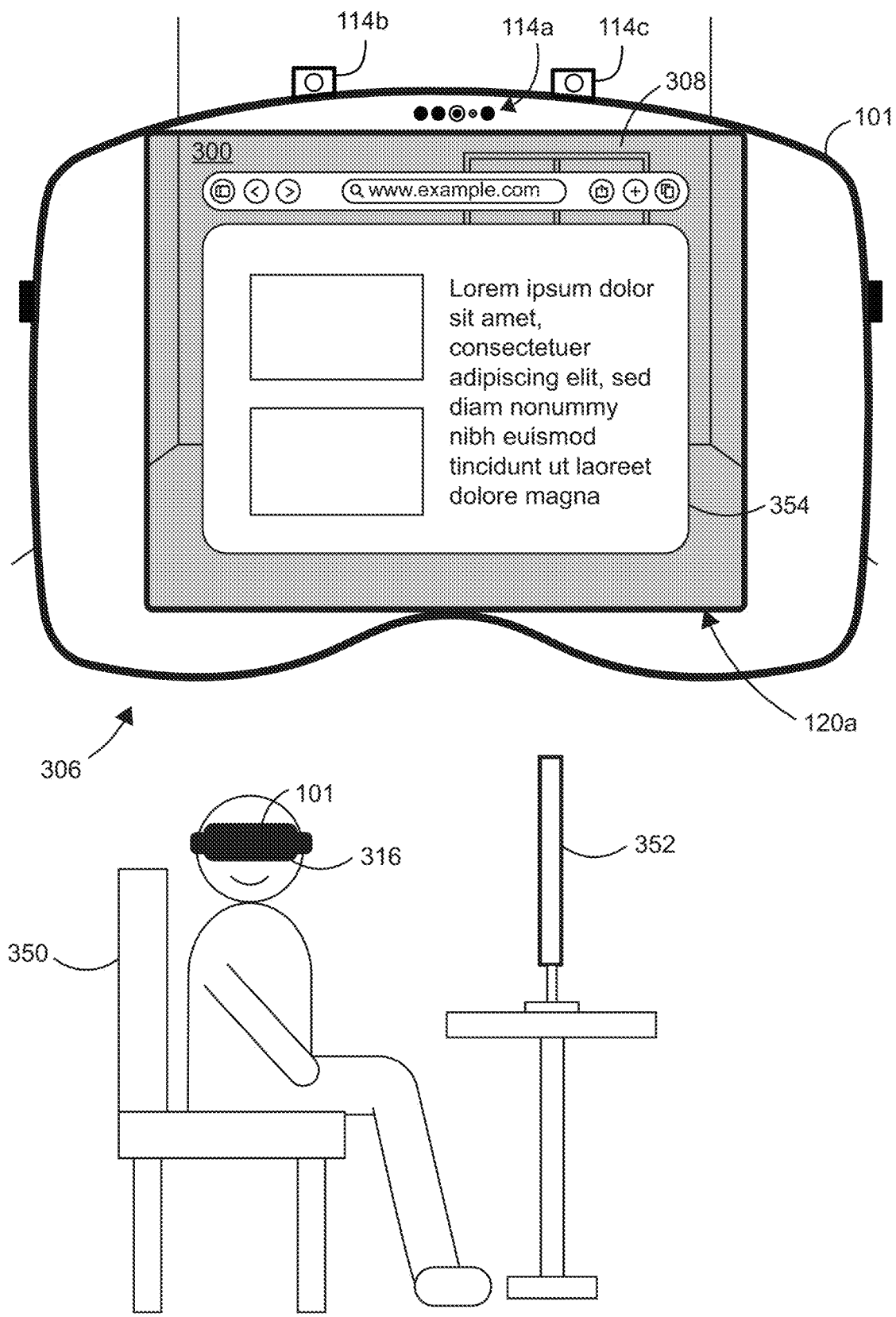
Figure 3O:
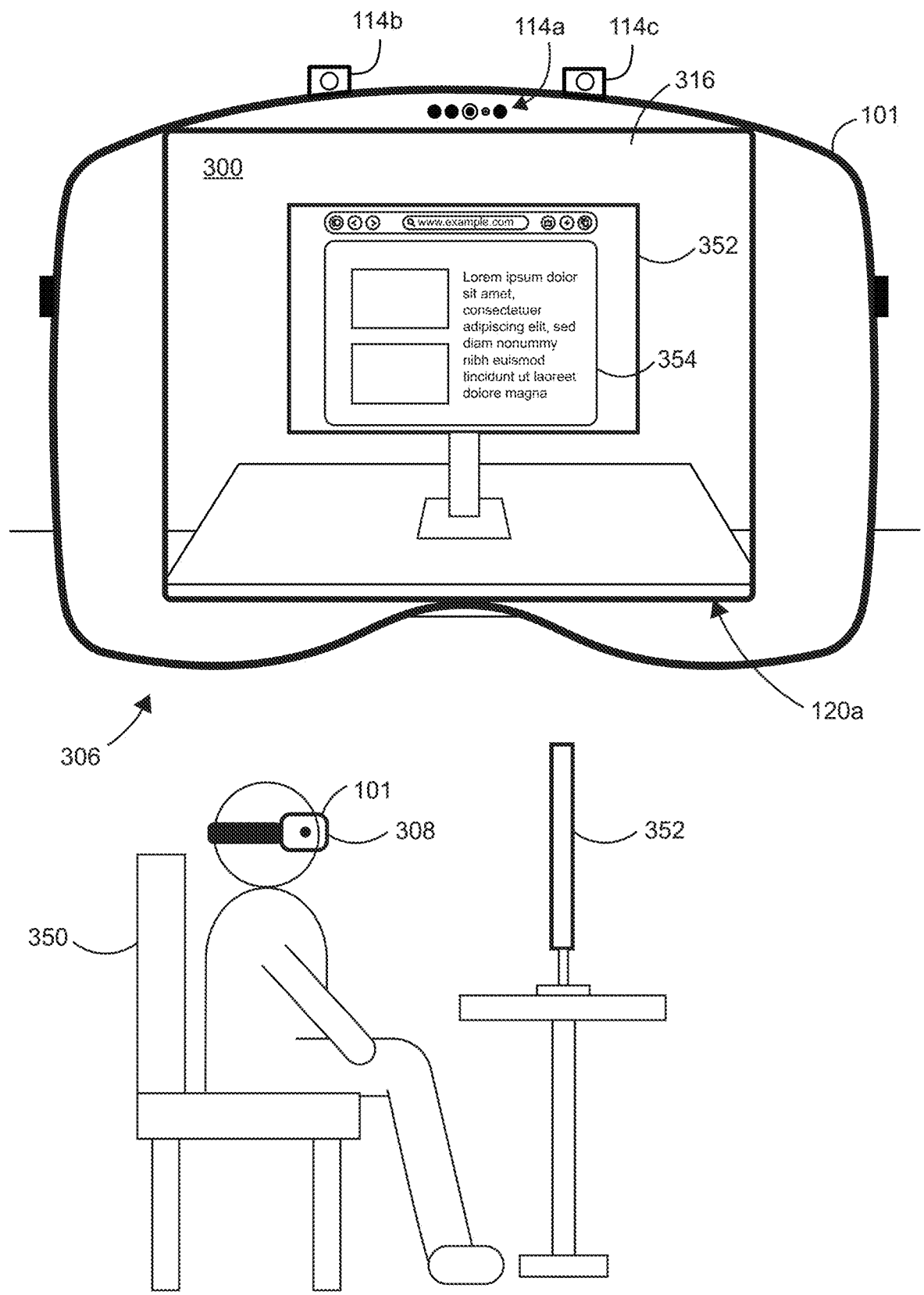

FIGS. 3A-3O illustrate examples of an electronic device presenting content differently and changing tinting levels of displays once one or more criteria are satisfied according to some examples of the disclosure. FIGS. 3A-3O are used to illustrate the methods described below, including process 400 in FIG. 4.

FIGS. 3A-3C illustrate an example of the electronic device changing the presentation of content and the tinting level of the display based on an indication from a second electronic device and/or an indication from a sensor of the electronic device. FIG. 3A illustrates an electronic device 101 presenting, via the display 120a, a three-dimensional environment 300 from a point of view of the user of the electronic device 101 (e.g., facing a desk 304 in a room in which electronic device 101 is located, as shown in FIG. 3B). In some examples, the three-dimensional environment 300 is a see-through environment of the physical environment. For example, the displays on electronic device 101 are transparent and a user can see the physical environment through the displays. In some examples, the electronic device 160 causes the electronic device 101 to present the three-dimensional environment 300. In some examples, a viewpoint of a user determines what content (e.g., physical objects and/or virtual objects) is visible in a viewport (e.g., a view of the three-dimensional environment 300 visible to the user via one or more display 120*a*, a display or a pair of display modules that provide stereoscopic content to different eyes of the same user, or through the optical see-through device). In some examples, the (virtual) viewport has a viewport boundary that defines an extent of the three-dimensional environment 300 that is visible to the user via the display 120*a* in FIGS. 3A-3O. In some examples, the region defined by the viewport boundary is smaller than a range of vision of the user in one or more dimensions (e.g., based on the range of vision of the user, size, optical properties or other physical characteristics of the one or more displays, and/or the location and/or orientation of the one or more displays relative to the eyes of the user). In some examples, the region defined by the viewport boundary is larger than a range of vision of the user in one or more dimensions (e.g., based on the range of vision of the user, size, optical properties or other physical characteristics of the one or more displays, and/or the location and/or orientation of the one or more displays relative to the eyes of the user). The viewport and viewport boundary typically move as the one or more displays move (e.g., moving with a head of the user for a head mounted device or moving with a hand of a user for a handheld device such as a tablet or smartphone). A viewpoint of a user determines what content is visible in the viewport. A viewpoint generally specifies a location and a direction relative to the three-dimensional environment, and as the viewpoint shifts, the view of the three-dimensional environment will also shift in the viewport. For a head mounted device, a viewpoint is typically based on a location, a direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include displays with video pass-through, portions of the physical environment that are visible (e.g., displayed, and/or projected) via the one or more displays are based on a field of view of one or more cameras in communication with the displays which typically move with the displays (e.g., moving with a head of the user for a head-mounted device or moving with a hand of a user for a handheld device such as a tablet or smartphone) because the viewpoint of the user moves as the field of view of the one or more cameras moves (and the appearance of one or more virtual objects displayed via the one or more displays is updated based on the viewpoint of the user (e.g., displayed positions and poses of the virtual objects are updated based on the movement of the viewpoint of the user)). For displays with optical see-through, portions of the physical environment that are visible (e.g., optically visible through one or more partially or fully transparent portions of the display generation component) via the one or more displays are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the displays moves (and the appearance of one or more virtual objects is updated based on the viewpoint of the user).

In FIG. 3A, the electronic device 101 includes a display 120*a* and a plurality of sensors as described above and controlled by the electronic device 101 and/or electronic device 160 to display one or more user interfaces while presenting true or real optical see-through in which portions of the physical environment are visible to the user through a transparent portion of the display, such as one or more hands of the user, such as hand 103, as shown in FIG. 1 and as described below while the user interacts with the electronic device 101, electronic device 160, and/or with the physical world. The figures herein illustrate an optical see-through that is presented to the user by electronic device 101 (e.g., and displayed by the display 120*a* of electronic device 101). In some examples, electronic device 101 may be similar to electronic device 101 in FIG. 1, or electronic device 201 in FIG. 2, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In some examples, electronic device 160 (e.g., shown in FIG. 3B and discussed below) may be similar to electronic device 160 in FIG. 1 or electronic device 260 in FIG. 2.

As shown in FIG. 3A, the electronic device 160 causes the electronic device 101 to display a user interface 302 of a movie player application in the three-dimensional environment 300 (showing the physical environment through the optical see-through) in a first manner (e.g., a full screen immersive user interface) accompanied with a first tinting level 308. In some examples, the electronic device 101 displays the user interface 302 while tinting the portions of display 120*a* corresponding to the physical environment 306 that are visible via the display 120*a* of electronic device 101 (e.g., and behind and surrounding the user interface 302) with a first tinting level 308. For example, as shown in FIG. 3A, the physical environment includes desk 304. While the electronic device 101 is displaying user interface 302, the representation of desk 304 is not presented and/or otherwise visible in the three-dimensional environment 300 from the viewpoint of the user. In some examples, while the electronic device 101 is displaying user interface 302, the display 120*a* of the electronic device 101 appears with a first tinting level 308 while the user is wearing the electronic device 101. For example, the display 120*a* of the electronic device 101 may be tinted with the first tinting level 308 such that other people looking at the electronic device 101 can see the first tinting level 308. In some examples, the first tinting level 308 is applied to the display 120*a* of electronic device 101. In some examples, while the electronic device 101 is displaying user interface 302 with the first tinting level 308, other people looking at the electronic device 101 can see the first tinting level 308 applied to the display 120*a*, and vise vera.

It should be understood that, in some examples, the electronic device 101 displays a user interface different from user interface 302 or a plurality of user interfaces (e.g., including or different from the user interface 302) associated with a plurality of different applications while concurrently presenting the three-dimensional environment 300 with the first tinting level 308. For example, as shown in FIG. 3A, the electronic device 101 displays the user interface 302 that is playing a movie, such as from a movie application, while tinting portions of display 120*a* corresponding to other portions of the three-dimensional environment 300 (e.g., behind and surrounding the user interface 302). In some examples, the electronic device 101 may display the same tinting characteristics as shown in FIG. 3A while the user is alternatively viewing and/or interacting with other user interfaces, such as, but not limited to, content user interfaces (e.g., web browsing user interfaces, video chatting user interfaces, video player user interfaces, music user interfaces, gaming user interfaces, and/or social media user interfaces). In some examples, a user of electronic device 101 may (e.g., manually or with verbal command) determine the applications and/or user interfaces to display in the first manner while the three-dimensional environment 300 is presented with the first tinting level 308.

In some examples, presenting content (e.g., user interface 302) in the first manner includes presenting content at a first size, a first brightness, a first opacity, a first location, and/or a first anchoring scheme. For example, as shown in FIG. 3A, the user interface 302 is presented at a first size that occupies a majority of the field of view of the three-dimensional environment 300 (e.g., a majority of the display 120*a*), at a first brightness that contrasts with the tinted background provided via the first tinting level 308, at a first opacity that limits the user's ability to see the representation of the physical environment behind and/or through the user interface 302, at a first location that is centered in the field of view of the three-dimensional environment 300, and with a first anchoring scheme. In some examples, the anchoring scheme refers to whether the user interface is displayed with a head-locked orientation, world-locked orientation, or a tilt-locked orientation, as described above. In some examples, in FIG. 3A, while the user interface 302 is displayed with the first anchoring scheme, the user interface 302 is displayed with a head-locked orientation. In some examples, a user of the electronic device 101 may change one or more of the characteristics of the display of the content discussed above (e.g., how the user interface is displayed).

In some examples, while displaying the content (e.g., user interface 302) in the first manner in the three-dimensional environment 300, the electronic device 101 or the electronic device 160 determines that one or more criteria are satisfied. As a result, the electronic device 101 displays the content in a second manner, as shown in FIG. 3B. Automatically displaying content in the second manner after determining that one or more criteria are satisfied allows the electronic device 101 to display/allows the user to view more of their physical environment 306 without additional inputs, thereby reducing erroneous inputs to the electronic device. Displaying content in the second manner optionally includes one or more of displaying the user interface 302 at a second size that is different than the first size, at a second brightness that is different than the first brightness, at a second opacity that is different than the first opacity, at a second location that is different than the first location, and/or according to a second anchoring scheme that is different than the first anchoring scheme. For example, as shown in FIG. 3B, the user interface 302 is displayed in the three-dimensional environment 300 smaller than the user interface 302 in FIG. 3A.

Alternatively, in some examples, the user interface is minimized, such that it is no longer displayed and/or visible in the three-dimensional environment 300 from the viewpoint of the user (e.g., the content is hidden, optionally represented by a user interface element when video playback continues as audio only). In some examples, the second size of the user interface 302 is dependent on the type of user interface that is displayed. For example, a user interface of a movie player application is displayed at a reduced size in the three-dimensional environment 300, as shown in FIG. 3B. Alternatively, a user interface of a web browser application may be minimized and not shown at all and/or may not be currently visible from the viewpoint of the user while the user interface is displayed in the second manner. In some examples, minimizing the content on the electronic device 101 includes ceasing the display of the user interface 302 on the electronic device 101 and displaying the user interface 302 on the electronic device 160. For example, a video user interface may be minimized on electronic device 101 and may automatically continue playing on the electronic device 160. Alternatively, the user of the electronic devices 101 and 160 may determine which user interfaces are minimized and/or which are displayed at a smaller size (e.g., user preference or setting). Additionally, as shown in FIG. 3B, the user interface 302 is less bright and less opaque than the user interface 302 in FIG. 3A to attract attention to and/or otherwise enable easy viewing of the representations of the physical environment 306 (e.g., to electronic device 160, desk 304, and/or table 312), while optionally drawing attention away from the user interface 302. In some examples, displaying content in the second manner (e.g., at a second size smaller than the first size) is accompanied with applying a second tinting level to the display 120*a* of the electronic device 101. As shown in FIG. 3B, a second tinting level 316 is applied to the display 120*a* such that the representations of the physical environment 306 are now clearly visible in the three-dimensional environment 300, enabling the user to view electronic device 160 through the display 120*a*. In other words, because user interface 302 is displayed at a smaller size (e.g., in the second manner) and because the second tinting level 316 corresponds to a transparent state of display 120*a*, the user is able to see the physical environment through the display 102*a* (via optical see through). The second tinting level 316 can be seen by other people because the display 120*a* of electronic device 101 is shown with the second tinting level 316, as shown in FIG. 3B. The electronic device 101 applies the second tinting level 316 to the display 120*a* to indicate (e.g., to other persons) that the content is being displayed in the second manner on the electronic device 101. As shown in FIG. 3B, the second tinting level 316 is more transparent (e.g., less opaque) than the first tinting level 308 of FIG. 3A. Additionally, in some examples, displaying content in the second manner includes displaying content using a world-locked orientation instead of a head-locked orientation. In some examples, a user may (e.g., manually via user input) change one or more characteristics of the second manner. Alternatively, in some examples, a user of electronic device 101 can change the tinting levels manually, separate from the content displaying feature described herein.

In some examples, the electronic device 101 changes the tinting level by adjusting the opacity of a dedicated layer of the display 120*a*. For example, the display 120*a* optionally includes a plurality of layers including one or more controllable tinting layers, where each controllable tinting layer may be configured to filter an adjustable amount of light (e.g., light having a particular wavelength or range of wavelengths). In some examples, one of the controllable tinting layers may include a frosted glass layer that can be controlled to scatter an adjustable amount of incident light corresponding to the first tinting level 308, the second tinting level 316, and/or other tinting levels as described herein. Alternatively, in some examples, the display 120*a* does not have a separate controllable tinting layer. For example, the tinting controls may be integrated into the display 120*a* (e.g., integrated in the other layers of display 120*a*).

FIG. 3B illustrates an example in which one or more first criteria and one or more second criteria are satisfied in order for the electronic device 101 to display content in a second manner and/or with the second tint. In some examples, satisfaction of the one or more first criteria is evaluated based on input detected by the electronic device 160 and satisfaction of the one or more second criteria is evaluated based on input detected by the electronic device 101. For example, the one or more first criteria include a criterion that is satisfied when the electronic device 160 detects an input (e.g., touch input to a touch screen, button inputs, etc.) and/or a criterion that is satisfied when the electronic device 160 detects motion, optionally a characteristic motion (e.g., lifting up electronic device 160). The one or more second criteria optionally include a criterion that is satisfied when the electronic device 101 detects a movement greater than a threshold movement (e.g., an indication of angling the head downward).

As shown in FIG. 3B, the user picks up electronic device 160 (e.g., detected by motion sensors having one or more characteristics of the motion sensors as described above with reference to FIGS. 2A-2B) and/or unlocks the electronic device 160 (e.g., including powering on a display of the electronic device 160) to view a messages user interface 314. In some examples, the user unlocked the electronic device 160 by providing user input detected via one or more input devices of electronic device 160 (e.g., image sensors, depth sensors, etc.). In some examples, the electronic device 160 uses biometric data such as a fingerprint or a face map of the user to verify the identity of the user to unlock the electronic device 160. In response to detecting a characteristic motion of the electronic device 160 and/or electronic device 101 (e.g., a horizontal and/or vertical movement of the electronic device 160 towards electronic device 101, such as corresponding to lowering the head by a threshold amount toward a handheld device and/or threshold movement of the handheld device toward the location of the head) and/or an input to unlock the electronic device 160, in some examples, the electronic device 160 transmits an indication to the electronic device 101 indicating that the one or more first criteria are satisfied for the electronic device 160. In some examples, a horizontal movement corresponds to a movement of the electronic device 160 from a first yaw position to a second yaw position. In some examples, a vertical movement corresponds to a movement of the electronic device 160 from a first pitch to a second pitch.

In FIG. 3B, while picking up and viewing the messages user interface 314 on electronic device 160, the user also tilts their head down to look at electronic device 160 (which is detected by electronic device 101). In some examples, the movement of the user's head when the user looks down at the electronic device 160 is greater than a threshold movement required by electronic device 101 to transition tinting levels and the manner in which content is displayed. In some examples, the movement is a movement relative to gravity and/or the horizon (e.g., a horizon of the three-dimensional environment 300, which optionally corresponds to a horizontal line or plane through (e.g., a center of) the field of view of the three-dimensional environment 300). In some examples, the movement is a movement relative to a forward direction for viewing content that is independent of gravity or the physical environment horizon.

In some examples, the threshold movement required by the electronic device 101 is dependent on the user interface that is displayed on the electronic device 101 (and/or that the user is engaging with). For example, and as shown in FIG. 3A, while watching a movie using user interface 302 typically associated with relatively less head movement, the threshold movement required for satisfying the one or more second criteria is lower than if the user were using a user interface that involves relatively more head movement (e.g., a gaming user interface). In some examples, the threshold movement required is a movement towards electronic device 160 (e.g., vertical rotational movement downwards (pitch) towards electronic device 160 as shown by FIGS. 3A and 3B) that may be 5 degrees, 10 degrees, 20 degrees, 30 degrees, 45 degrees, etc. of movement from a first position (shown in FIG. 3A) depending on the user interface displayed on electronic device 101. In some examples, using different criteria movements based on the user interface allows the electronic device to automatically transition the content from being displayed in the first manner to being displayed in the second manner while reducing erroneous transitions based on movement.

In response to detecting that the one or more first criteria and the one or more second criteria are satisfied (e.g., at the electronic device 160, at the electronic device 101, or at a combination of both devices), the electronic device 101 ceases displaying content in the first manner and begins displaying content in the second manner, as described above. For example, the user interface 302 is automatically displayed at a smaller size while the electronic device 101 is displaying content in the second manner. Displaying the user interface 302 at a smaller size allows the representations of the physical environment 306 to be visible. In some examples, the movie continues to be played in user interface 302 while at the smaller size. In some examples, displaying content in the second manner allows the user to view the electronic device 160 without obstruction. For example, the user may want to read a notification, such as a text message, email, social media notification, or other notifications, or otherwise focus on electronic device 160. Although FIGS. 3A-3C primarily focuses on the first criteria and the second criteria, the operations described herein may be based on a subset of the first and/or second criteria.

In some examples, the user may want to resume looking at user interface 302 after interacting with electronic device 160. As shown in FIG. 3C, the user may move electronic device 160 out of their field of view (e.g., setting the electronic device 160 back on desk 304) and/or move their head back to the position shown in FIG. 3A (e.g., raise the head to the first position), which produces movement of the electronic device 101. As shown in FIG. 3C, during this movement the user has moved the electronic device 160 from a second position (e.g., shown in FIG. 3B) to a third position that is between the first position and the second position. The electronic device 160 may cause the electronic device 101 to transition the display 120*a* (or displays) of the electronic device 101 from the second tinting level 316 to the first tinting level 308 (and the three-dimensional environment 300 from the second tinting level 316 to the first tinting level 308) after detecting (e.g., using one or more input devices, such as an IMU sensor and/or accelerometer) that the electronic device 160 is being moved towards the first position. For example, the electronic device 101 displays the content in the three-dimensional environment 300 in a third manner including a third tinting level 320 while the user is moving their head back to the first position and placing the electronic device 160 down to its original position (shown in FIG. 3A). The third tinting level 320 corresponds to the third physical tinting level 320 that is applied to the display(s) of the electronic device 101, as shown in FIG. 3C. In some examples, the third tinting level 320 is less transparent than the second tinting level 316 but more transparent than the first tinting level 308. Displaying content in a third manner while transitioning from the second manner to the first manner allows the electronic device to provide feedback to the user and indicate to the user that the content is transitioning from the second manner to the first manner.

In some examples, while transitioning from the second manner to the first manner, the content in the three-dimensional environment 300 transitions from the second size to the first size, the second brightness to the first brightness, the second opacity to the first opacity, the second location to the first location, and/or from the second anchoring scheme to the first anchoring scheme. In some examples, transitioning from the second manner to the first manner includes displaying content in a third manner which is a manner that allows a gradual transition from the second manner to the first manner. For example, as shown in FIG. 3C, transitioning display of the user interface 302 from the second size to the first size includes displaying user interface 302 at a third size that is larger than the second size, but smaller than the first size, in the three-dimensional environment 300. In some examples, while displaying content in the third manner, the electronic device 160 detects that the user is moving the electronic device 160 toward the second position of electronic device 160 (e.g., to resume looking at electronic device 160) and movement of the electronic device 101 to the second position of electronic device 101 (as shown in FIG. 3B). As a result, the electronic device 160 causes the electronic device 101 to gradually transition displaying the content from the third manner to the second manner (e.g., instead of the first manner). Additionally or alternatively, in some examples, causing the electronic device 101 to display content in the second manner may also include a gradual transition from the first manner to the second manner similar to the description of the gradual transition from the second manner to the first manner as described above. In some examples, once the one or more first criteria and/or the one or more second criteria are no longer satisfied, the electronic device 101 returns to the view shown in FIG. 3A. For example, once the electronic device 101 is returned to the first position and/or electronic device 160 is returned to its first position, the electronic device 101 resumes displaying content in the first manner and with the first tint. Additionally, or alternatively, in some examples, the electronic device 101 resumes displaying content in the first manner with the first tint when the electronic device 160 is out of the field of view of electronic device 101 and/or when electronic device 101 and/or electronic device 160 is raised by a second threshold amount less than the threshold amount described above.

FIG. 3D illustrates an alternate example wherein one or more criteria are met to cause the electronic device 101 to display content in the second manner. In some examples, the electronic device 160 causes the electronic device 101 to display content in the second manner when movement is detected by the electronic device 101 (e.g., as opposed to movement being detected by both the electronic device 101 and the electronic device 160) from a first position to a second position. As described above, the first position is the position that electronic device 101 was in while the electronic device 101 displays content in the first manner (e.g., in FIG. 3A) and the second position is the position of the electronic device 101 while displaying content in the second manner (e.g., in FIG. 3B). In some examples, and as described in FIG. 3B, the electronic device 101 uses one or more sensors, such as an IMU sensor, to detect movement that is greater than a threshold movement.

As shown in FIG. 3D, the electronic device 101 detects vertical movement greater than a threshold movement, which causes the electronic device 101 to display content in the second manner. In some examples, the electronic device 101 may detect horizontal/angular movement greater than a threshold movement to cause the electronic device 101 to display content in the second manner. Horizontal/angular movement is described in greater detail in FIGS. 3E-3F. In some examples, the one or more criteria also include a criterion that is satisfied when the display of electronic device 160 is on, such as when electronic device 160 receives an alert (e.g., a notification). As shown in FIG. 3D, the display of electronic device 160 is on and is displaying a lock screen user interface 324. In some examples, the display is on as a result of electronic device 160 receiving an indication of a notification event and displaying a visual indication 326 of the notification. In some examples, the electronic device 101 detects a movement greater than a threshold movement in response to the electronic device 160 displaying the visual indication 326 (e.g., as a result of the user moving their head downward in the direction of the electronic device 160).

FIGS. 3E-3F illustrate an example wherein the electronic device 160 causes the electronic device 101 to display content in the second manner in response to detecting a sound and a corresponding movement of the electronic device 160. In some examples, electronic device 160, electronic device 101, and/or a different electronic device (e.g., an external microphone communicatively connected to electronic device 160 and/or electronic device 101) detect a sound 336 and a direction of the sound 336 (e.g., behind the user of electronic device 101 as shown in the figures). Additionally, in some examples, the electronic device 101, the electronic device 160, and/or a communicatively connected electronic device detect a rotation of electronic device 101 (e.g., a horizontal/angular rotation) towards the sound 336. As a result of detecting the sound 336 and a rotation that is greater than a threshold movement/rotation, as described above, towards the sound 336, the electronic device 160 causes the electronic device 101 to display content in the second manner. For example, as shown in FIG. 3F, the user of electronic device 101 rotates the electronic device 101 to a second position towards the direction of sound 336. As a result, the electronic device 101 presents the content in the three-dimensional environment 300 in the second manner, including changing the tinting of the electronic device 101 from the first tinting level 308 to the second tinting level 316. Changing the tinting level allows the person making sound 336 (e.g., speaking) to determine that the user of electronic device 101 is looking at them (e.g., changing the tinting allows the person to see the eyes of the user of electronic device 101) and allows the user of electronic device 101 to see the person making sound 336.

In some examples, the one or more first criteria for causing the electronic device 101 to display content in the second manner may be solely based on movement of electronic device 101 (rather than also based on movement and/or an input of electronic device 160). In some examples, such as in the example described in FIGS. 3E-3F, the electronic device 101 moves (rotationally and horizontally) towards the sound detected by a microphone. During this interaction, the electronic device 160 optionally does not move or moves below a threshold distance (horizontally and rotationally) relative to the first position of the electronic device 160. In some examples, the first position is the position of the electronic device 160 while the electronic device 101 is displaying content in the first manner. For example, the electronic device 160 may be in the user's pocket and may move a negligible amount during the interaction with the person shown in FIGS. 3E-3F. In some examples, the one or more first criteria for causing the electronic device 101 to display content in the second manner may include any combination of criteria as described herein.

Alternatively, in some examples, if both the electronic device 101 and the electronic device 160 move in the same direction (e.g., and with the same speed and/or acceleration), the electronic device 101 optionally does not display content in the second manner. For example, a user may be rotating in their chair, which results in both the electronic device 101 and the electronic device 160 moving (e.g., at the same speed and in the same direction). In some such examples, the electronic device 101 does not begin displaying content in the second manner.

FIGS. 3G-3H illustrate an alternative example of content presented in the second manner. In some examples, rather than wholly changing the characteristics of the three-dimensional environment 300 as described in the figures above, the electronic device 101 may selectively display portions of the content in the second manner in the three-dimensional environment 300 and selectively tint portions of the one or more displays with the second tint. For example, in FIG. 3G, in response to determining that the one or more criteria for presenting content in the second manner are satisfied (e.g., detecting that the display of electronic device 160 is on, detecting that electronic device 160 receives an alert (e.g., a notification), and/or detecting that the movement of the electronic device 160 is greater than a threshold distance as described herein), the electronic device 160 causes the electronic device 101 to apply bubble effect 330 to the three-dimensional environment 300. In some examples, applying bubble effect 330 includes displaying a (e.g., predetermined) portion of the three-dimensional environment 300, including the user interface 302, with a second tinting level 316 that is more transparent than the first tinting level 308. In some examples, the bubble effect 330 includes a boundary between the one or more areas of the display with the second tinting level 316 and the one or more areas of the display with the first tinting level 308. Although FIGS. 3G-3H illustrates the bubble effect 330 with a curved boundary (e.g., spherical, conic section, etc.) between the first tinting level 308 and the second tinting level 316, the bubble effect 330 may be displayed with other boundaries (e.g., rectangular, planar, or other geometries dividing one or more areas of the display with the first tinting level 308 and the one or more areas of the display with the second tinting level 316). In some examples, bubble effect 330 may be increased in size (e.g., volume) as the electronic device 160 detects movement of the electronic device 160 towards the user (e.g., toward the electronic device 101), as shown in FIG. 3H. For example, as the elevation of the electronic device 160 (relative to the ground) increases, the size of the bubble effect 330 increases. In some examples, the bubble effect 330 may be increased in size as the user tilts their head (and electronic device 101) towards electronic device 160 (e.g., the electronic device 160 occupies more real estate in the user's field of view). For example, as shown in FIG. 3H, a smaller portion of the user interface 302 remains displayed in the three-dimensional environment 300 and a greater portion of the physical environment 306 becomes visible from the viewpoint of the user of the electronic device 101. Accordingly, in some examples, applying the bubble effect 330 may allow the user to gather information indicative of a context of the physical environment 306 (e.g., view and/or interact with one or more physical objects in the physical environment 306, such as the electronic device 160) without ceasing and/or minimizing the display of the user interface 302, as one benefit. In some examples, the display(s) of electronic device 101 may also include both the first tinting level 308 and the second tinting level 316. For example, as shown in FIG. 3H, an area of the display(s) of the electronic device 101 represented by bubble effect 330 includes the second tinting level 316.

In some examples, the electronic device 160 includes an image sensor, as described in FIGS. 2A-2B. In some examples, the image sensor is an infrared sensor, a camera, or other optical sensor. In some examples, the electronic device 160 may use the image sensor to determine a location of the display 120a (e.g., one or more displays of electronic device 101) relative to the location of the electronic device 160. In other words, the electronic device 160 may use the image sensor to determine a relationship between the position of electronic device 101 and electronic device 160. For example, the electronic device 160 uses the location of the electronic device 101 relative to the electronic device 160 to determine the location of electronic device 160 relative to electronic device 101. In some examples, after determining the relationship between the position of electronic device 101 and electronic device 160, the electronic device 160 (or electronic device 101) causes the second tinting level 308 to be applied to the portions of the display 120 corresponding to the location of electronic device 160. For example, in FIGS. 3G and 3H, the electronic device 160 causes the electronic device 101 to apply bubble effect 330 to the areas of the three-dimensional environment 300 including electronic device 160.

Whereas FIGS. 3G-3H illustrates the bubble effect 330, in some examples, the bubble effect 330 may be replaced by a tinting gradient, such as shown in FIGS. 3H-A. In some examples, the bubble effect 330 includes two tinting levels with a boundary therebetween, whereas the tinting gradient shown in FIGS. 3H-A includes more than two tinting levels. For example, the tinting gradient effect includes the boundary between the first tinting level and the second tinting level, and includes intermediate tinting levels to gradually transition the tinting level from the first tinting level to the second tinting level. In some examples, the tinting gradient includes a gradient of tinting levels (e.g., including the third tinting level, described above) to gradually transition from the first tinting level to the second tinting level. For example, in FIG. 3G, the electronic device 160 optionally uses the image sensors to determine the location of the electronic device 101 relative to electronic device 160 and causes a display of a tinting gradient. For example, as shown in FIGS. 3H-A the second tinting level is applied at the bottom of display 120a to the location of electronic device 160, the first tinting level is applied at the top of display 120a, and the electronic device 101 gradually transitions between the first tinting level and the second tinting level. In some examples, the electronic device 160 causes the display 120a to dynamically adjust the tinting gradient based on the location of electronic device 160. For example, if the location of electronic device 160 moves upward, towards the top of electronic device 101, then the electronic device 160 causes the gradient to move such that there is more of display 120*a* including the second tinting level. Specifically, the boundaries of the first tinting level and the second tinting level and the gradient in between move such that the location of electronic device 160 to the bottom of display 120*a* includes the second tinting level.

In some examples, the electronic device 101 and/or electronic device 160 may not have a high reliability on the position of electronic device 160 relative to the display 120*a* of electronic device 101. In such examples, the electronic device 160 may cause the electronic device 101 to have defined gradient levels based on an estimated location of electronic device 160. In some examples, the defined gradient levels include 25%, 50%, 75%, or 100% second tinting level from the bottom up based on the estimated location of the electronic device 160.

In some examples, one or more third criteria are required to be satisfied for the electronic device 160 to cause the electronic device 101 to resume displaying content in the first manner discussed above. In some examples, after one or more third criteria are satisfied, the electronic device 160 causes the electronic device 101 to display content in the first manner, including applying the first tinting level 308 to the one or more displays which is also shown in the three-dimensional environment 300, as shown in FIG. 3I. In some examples, the one or more third criteria may be satisfied when the criteria to display content in the second manner are no longer satisfied. In some examples, the one or more third criteria may include a criterion that is satisfied when the display of the electronic device 160 is turned off (e.g., by the user or after a threshold amount of time has passed without the electronic device 160 receiving an input). For example, as shown in FIG. 3I, the display of the electronic device 160 is no longer active and the electronic device 101 is in the first position. In some examples, the one or more third criteria are satisfied when the electronic device 101 and the electronic device 160 are in their respective first positions. For example, the electronic device 101 and/or electronic device 160 detect movement of the electronic device 101 and/or the electronic device 160 consistent with returning the respective electronic devices to their first positions. In some examples, the one or more third criteria are satisfied when the electronic device 160, the electronic device 101, and/or a different electronic device (e.g., an external microphone) no longer detect sound. In some examples, resuming displaying content in the first manner includes causing the electronic device 101 to apply the first tinting level 308 to the display(s), as shown in FIG. 3I.

FIGS. 3J-3M illustrates additional examples in which the electronic device 101 and/or electronic device 160 apply a second tinting level to the display 120*a* of the electronic device 101 in response to detecting that the one or more second criteria are satisfied. As described above, the one or more second criteria are satisfied when the electronic device 101 detects a movement greater than a threshold movement. In some embodiments, automatically changing the tinting level in response to detecting certain movements (e.g., sitting to standing, standing to walking, or other movements) allows the user to better understand their physical environment without additional inputs to the electronic device 101 and/or electronic device 160 (e.g., without having to close, move, or resize virtual content).

In FIG. 3J, the electronic device 101 detects that the user is sitting down (e.g., on chair 350). In FIG. 3J, the electronic device 101 displays (or the electronic device 160 causes the electronic device 101 to display) the user interface 302 in the first manner with the first tinting level 308, as described in greater detail in FIG. 3A. In some examples, while the electronic device 101 and/or electronic device 160 detects that the user remains seated (e.g., does not detect a movement that satisfies the one or more second criteria), the electronic device 101 continues to display the user interface 302 in the first manner with the first tinting level.

FIGS. 3K-3M illustrate examples in which the electronic device 101 and/or electronic device 160 detects a movement that satisfies the one or more second criteria. In some examples, the one or more second criteria are satisfied when the electronic device 101 and/or electronic device 160 detects a movement indicative of a transition between the user sitting down and the user standing up (e.g., detecting a threshold increase in height from the ground) and/or a movement indicative of a user walking (e.g., detecting linear velocity greater than a threshold). In some examples, the one or more second criteria are satisfied when the electronic device 101 and/or electronic device 160 detects a movement that exceeds a threshold movement (e.g., sudden movement indicative of a user falling). For example, a detected acceleration is greater than a threshold acceleration.

In FIG. 3K, the electronic device 101 ceases displaying user interface 302 (e.g., a video application) and the display 120*a* changes from the first tinting level to the second tinting level in response to the electronic device 101 and/or electronic device 160 detecting a movement indicative of the user standing up. In some examples, the display 120*a* changes from the first tinting level to the second tinting level and the electronic device 101 ceases displaying user interface 302 because the electronic device 101 and/or 160 detect a transition from a state where situational awareness of the physical environment 306 is less important to a state where situation awareness of the physical environment 306. For example, while in a sitting state, the user of electronic device 101 and/or 160 is not at risk of collisions with the physical environment in the absence of locomotion in the physical environment. In contrast, the user movement indicative of a transition to standing increases the likelihood of locomotion or an increased risk of collisions unless the user is able to view their physical environment 306. For example, in FIG. 3K, the electronic device 101 and/or electronic device 160 detects that the user is standing (e.g., to begin moving to a different location, to draw their attention to a different object other than display 120*a*, etc.). In some example, the electronic device 101 and/or electronic device 160 uses one or more location, orientation, and/or movement sensors such as an accelerometer and/or inertial measurement unit (IMU) to detect that the electronic device 101 is moving against a gravity vector with a positive acceleration and/or velocity that is above a threshold amount of acceleration or velocity, indicating that the user is transitioning from a sitting position to a standing position.

In FIG. 3L, the electronic device 101 and/or electronic device 160 detects that the user is walking. In some examples, the electronic device 101 and/or electronic device 160 may use a global positioning sensor, IMU, and/or other sensors to determine that the user is walking (moving). For example, the electronic device 101 and/or electronic device 160 may detect that the location of the respective device is moving and/or a change in acceleration, velocity, change in position, and/or other movement that is consistent with walking. For example, the electronic device 101 and/or electronic device 160 detects a linear velocity above a threshold velocity (with the threshold turned by implementors to differentiate between standing and walking).

In some examples, in response to detecting a standing position or a walking movement, the electronic device 101 may present the user interface 302 such as shown in FIG. 3B. Specifically, rather than minimizing the content, as shown in FIGS. 3K and 3M, the electronic device 101 displays the content of user interface 302 at a smaller size, as shown in FIG. 3B.

In some examples, the electronic device 101 may resume displaying the user interface 302 with the first tinting level in response to detecting a movement indicative of the user sitting down (or a movement indicative of the user walking to standing stationary). For example, the electronic device 101 and/or electronic device 160 detects a movement with the gravity vector with a positive acceleration and/or velocity indicative of transition from standing to sitting. In some examples, the electronic device 101 and/or electronic device 160 detects a downward position change indicative of transition from standing to sitting. In some examples, the electronic device 101 and/or electronic device 160 detects a linear velocity below a threshold velocity (with the threshold turned by implementors to differentiate between standing and walking) indicative of transition from walking to standing stationary. In some examples, the electronic device 101 resumes displaying the user interface 302 with the first tinting level (e.g., the user interface that was previously displayed while the user was sitting) in response to detecting that the user is no longer standing (e.g., the user is sitting down) and/or moving (e.g., the user is stationary).

In FIG. 3M, the electronic device 101 ceases displaying user interface 302 and changes the tinting level from the first tinting level to the second tinting level in response to detecting a movement that exceeds a threshold movement (e.g., indicative of falling or other sudden movement). For example, the electronic device 101 and/or 160 includes an accelerometer, an IMU, and other motion sensors that detects a sudden change in acceleration and/or an acceleration above a threshold acceleration. Alternative or additionally, the electronic device 101 and/or 160 may detect a sudden deceleration (or acceleration followed by deceleration). For example, the electronic device 101 and/or 160 detects a fall sustained by a user. In response to detecting the sudden movement, the electronic device 101 ceases displaying user interface 302 and changes the tinting level from the first tinting level 308 to the second tinting level 316 such that the user is able to focus on physical environment 306 to assess the situation, take action during and/or to recover from the fall, and/or receive care.

FIGS. 3N-3O illustrates an example wherein the electronic device 101 and/or electronic device 160 changes the manner in which content is presented based on the satisfaction of one or more fourth criteria. In FIGS. 3N and 3O, the electronic device 101 and/or electronic device 160 is also in communication with a third electronic device 352. In some examples, the electronic device 352 is an external display device and/or a computer, such as a desktop computer, television, or laptop. In some examples, the electronic device 352 is a smart phone, tablet, and/or head-mounted display.

In FIG. 3N, the display 120a is displaying a user interface 354 of a web browser application. In FIG. 3N, the electronic device 101 does not have electronic device 352 in the field of view (e.g., the electronic device 352 is not displayed in the three-dimensional environment 300). While the electronic device 101 does not have the electronic device 352 in the field of view, the electronic device 101 (and/or electronic device 160) is displaying the user interface 354 on display 120a. In some examples, if the electronic device 101 and/or electronic device 160 detects an electronic device in the field of view of electronic device 101 that includes capabilities for displaying the user interface that is currently displayed on display 120a, then the electronic device 101 ceases presenting the user interface on display 120a and the electronic device in the field of view of the electronic device 101 begins presenting the respective user interface as shown in FIG. 3O. In other words, in FIG. 3N, the electronic device 101 is displaying the user interface 354 in the first manner with the first tinting level 316. In response to detecting that the electronic device 352 is in the field of view of electronic device 101, the electronic device 101 begins presenting content in a fourth manner, wherein the electronic device 101 ceases displaying the content on display 120a and begins presenting pass-through video of the physical environment 306, and the electronic device 352 begins displaying the content.

FIG. 3O illustrates the electronic device 101 presenting pass-through video of the physical environment 306, including a representation of electronic device 352 displaying user interface 354. In some examples, the electronic device 101 presents pass-through video (e.g., while including the second tinting level 308) in response to detecting that one or more criteria are satisfied. For example, the one or more criteria optionally include a criterion that is satisfied when the electronic device 160, electronic device 101, and/or electronic device 352 detects that the user's attention is directed towards electronic device 352. In some examples, the one or more criteria include a criterion that is satisfied when the electronic device 352 includes capabilities to display the user interface. As described above, the electronic device 101 and/or electronic device 160 detects that the electronic device 352 includes capabilities to display the user interface. For example, the electronic device 352 includes the application corresponding to user interface 354 (e.g., the application is downloaded), and/or the electronic device 352 is in communication with electronic device 101 and/or electronic device 160. In some examples, the electronic devices 101, 160, and/or 352 detects that the user's attention is directed towards electronic device 352 based on gaze data, image data (e.g., from outward facing cameras capturing images including the electronic device 352), and/or head rotation data from the one or more image sensors and/or motion sensors (e.g., inward facing cameras, outward facing cameras, IMUs, and other sensors) on electronic device 101, 160, and/or 352. Additionally or alternatively, in some examples, the electronic devices 101, 160, and/or 352 detects inputs directed towards electronic device 352 such as tap inputs (e.g., with a finger, a stylus, keyboard, and/or cursor), gaze inputs, gesture inputs, and/or voice inputs. In some examples, the electronic device 352 includes one or more accessories that can receive inputs from the user such as a microphone, mouse, trackpad, and/or keyboard.

Whereas FIG. 3N and FIG. 3O illustrate an example with an electronic device 352, such as a desktop or laptop computer, a similar interaction may be performed using any electronic device, such as electronic device 160. For example, the electronic device 101 and/or electronic device 160 may detect that electronic device 160 is in the field of view and then the electronic device 160 may begin presenting the content that was previously being presented on display 120a.

Alternatively or additionally, in some examples, the electronic device 160 causes the electronic device 101 to perform the tinting actions described herein and shown in FIGS. 3N and 3O when the user interface 354 in the three-dimensional environment 300 is anchored relative to the electronic device 352. For example, the user interface 354 may be anchored at a location in the three-dimensional environment (e.g., above, to the left of, to the right of, below, etc.) the electronic device 352 (e.g., to increase the information viewable by the user and maintain a connection between physical objects and virtual content in the environment). While viewing the user interface 354 in the three-dimensional environment 300, such as shown in FIG. 3N, the electronic device 160 causes the electronic device 101 to include the first tinting level 316. In response to detecting that the electronic device 101 includes the electronic device 352 in the field of view, the electronic device 160 causes the electronic device 101 to include the second tinting level 308 so that the user is able to see the electronic device 352.

In some examples, while presenting pass-through video at the second tinting level 308 (such as shown in FIGS. 3B, 3C, 3D, 3G, 3H, 3H-A, and 3O), the electronic device 160 may transmit an indication to electronic device 352 to increase a brightness or change the color of the display associated with electronic device 352. In some examples, while presenting content through the display 120*a* using the second tinting level 308, the electronic devices in the pass-through video may appear dimmer or off-color compared to if the user were to look at the respective electronic devices without using display 120*a* and/or electronic device 101. For example, the display 120*a* and/or the tinting applied to display 120*a* may cause the brightness of an external display or a color of an external display to appear differently than without viewing through the display 120*a* (e.g., electronic device 101). As such, the electronic device 101 and/or electronic device 160 may transmit an indication to the respective electronic device to increase a brightness or change the color of the display associated with the respective electronic device to counteract the respective tinting effects (e.g., to provide the user with a better viewing experience). For example, in FIG. 3O, the electronic device 352 may increase the brightness of the display and/or provide color adjustments. Additionally, in FIGS. 3B, 3C, 3D, 3G, and/or 3H, the electronic device 160 may brighten the display and/or adjust the color while the electronic device 101 includes the second tinting level 308. In some examples, changing the brightness and/or color of the external display to account for the viewing through the electronic device 101 improves user interaction with the external display and with electronic device 101 by counteracting the impact of the electronic device 101 lenses/display(s) (e.g., display 120*a*). In some examples, color adjustments include adding a color tinting (e.g., yellow, blue, green, or other color) and/or changing the RGB (red, green, blue) standard to display colors more accurately to the real-world colors.

Figure 4:
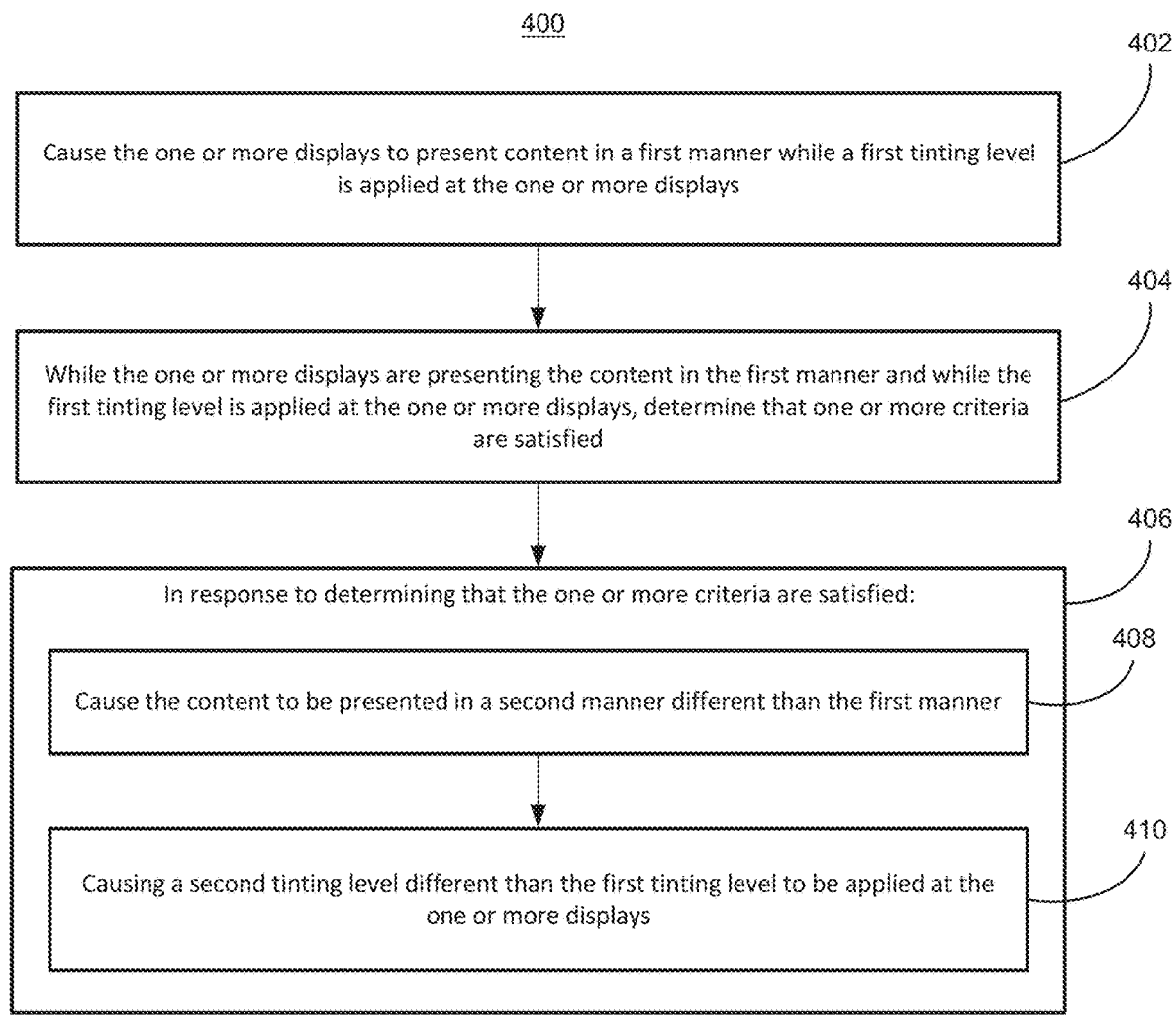
FIG. 4 illustrates a flow diagram illustrating an example process for causing the electronic device to present content in a second manner instead of a first manner in a three-dimensional environment according to some examples of the disclosure.

FIG. 4 illustrates a flow diagram illustrating an example process for causing the electronic device to present content in a second manner instead of a first manner in a three-dimensional environment according to some examples of the disclosure. In some examples, process 400 begins at an electronic device in communication with one or more displays and one or more input devices. In some examples, the electronic device is optionally a head-mounted display similar or corresponding to electronic device 201 of FIG. 2A or a mobile electronic device similar or corresponding to electronic device 260 of FIG. 2B. As shown in FIG. 4, in some examples, at 402, the electronic device causes the one or more displays to present content in a first manner while a first tinting level is applied at the one or more displays. For example, the electronic device (e.g., electronic device 160 in FIG. 3A) causes the one or more displays of the electronic device 101 in FIG. 3A to present content, such as user interface 302, in a first manner (e.g., taking up the total field of view of electronic device 101), and with a first tinting level 308.

In some examples, at 404, while the one or more displays are presenting the content in the first manner and while the first tinting level is applied at the one or more displays, the electronic device determines that one or more criteria are satisfied. For example, the electronic device detects a vertical (e.g., upward) movement of the electronic device 160 greater than a threshold movement towards the user of electronic device 101, a movement of the electronic device 101 towards the electronic device 160 greater than a threshold (rotational) movement, or both, as shown in FIG. 3B. Alternatively or additionally, in some examples, the electronic device detects a sound and a movement of the electronic device 101 towards the sound, as shown in FIG. 3F. In some examples, at 406, in response to determining that the one or more criteria are satisfied, at 408, the electronic device causes the content to be presented in a second manner different than the first manner. For example, as shown in FIG. 3D, the electronic device 101 presents the content in a second manner such as presenting user interface 302 at a smaller size than in FIG. 3A.

In some examples, at 410, the electronic device causes a second tinting level different than the first tinting level to be applied at the one or more displays. For example, as shown in FIG. 3B, the electronic device 160 causes the electronic device 101 to apply a second tinting level 316 that is more transparent than the first tinting level 308.

It is understood that process 400 is an example and that more, fewer, or different operations can be performed in the same or in a different order. Additionally, the operations in process 400 described above are, optionally, implemented by running one or more functional modules in an information processing apparatus such as general-purpose processors (e.g., as described with respect to FIGS. 2A-2B) or application specific chips, and/or by other components of FIGS. 2A-2B.

Therefore, according to the above, some examples of the disclosure are directed to a method, comprising an electronic device in communication with one or more displays and one or more input devices: causing the one or more displays to present content in a first manner while a first tinting level is applied at the one or more displays; while the one or more displays are presenting the content in the first manner and while the first tinting level is applied at the one or more displays, determining that one or more criteria are satisfied; in response to determining that the one or more criteria are satisfied: causing the content to be presented in a second manner different than the first manner; and causing a second tinting level different than the first tinting level to be applied at the one or more displays. Additionally or alternatively to one of more of the examples disclosed above, in some examples, causing the one or more displays to present the content in the first manner further comprises causing the one or more displays to present the content at a first size; and causing the one or more displays to present the content in the second manner further comprises causing the one or more displays to present the content at a second size smaller than the first size. Additionally or alternatively to one of more of the examples disclosed above, in some examples, causing the one or more displays to present the content in the first manner further comprises causing the one or more displays to present the content at a first brightness; and causing the one or more displays to present the content in the second manner further comprises causing the one or more displays to present the content at a second brightness less than the first brightness. Additionally or alternatively to one of more of the examples disclosed above, in some examples, causing the one or more displays to present the content in the first manner further comprises causing the one or more displays to present the content at a first opacity; and causing the one or more displays to present the content in the second manner further comprises causing the one or more displays to present the content at a second opacity less than the first opacity. Additionally or alternatively to one of more of the examples disclosed above, in some examples, causing the one or more displays to present the content in the first manner further comprises causing the one or more displays to present the content at a first location on the one or more displays; and causing the one or more displays to present the content in the second manner further comprises causing the one or more displays to present the content at a second location different than the first location on the one or more displays. Additionally or alternatively to one of more of the examples disclosed above, in some examples, causing the one or more displays to present the content in the first manner further comprises causing the one or more displays to present the content according to a first anchoring scheme; and causing the one or more displays to present the content in the second manner further comprises causing the one or more displays to present the content at a second anchoring scheme different than the first anchoring scheme. Additionally or alternatively to one of more of the examples disclosed above, in some examples, the second tinting level provides the one or more displays with a higher transparency level compared with the first tinting level. Additionally or alternatively to one of more of the examples disclosed above, in some examples, the one or more displays and one or more input devices are included within a second electronic device, and wherein the one or more criteria include a criterion that is satisfied when a movement of the second electronic device satisfies one or more second criteria. Additionally or alternatively to one of more of the examples disclosed above, in some examples, the one or more second criteria include a criterion that is satisfied when the movement is greater than a threshold movement of the second electronic device. Additionally or alternatively to one of more of the examples disclosed above, in some examples, the threshold movement of the second electronic device is based on the content presented on the one or more displays. Additionally or alternatively to one of more of the examples disclosed above, in some examples, the one or more second criteria include a criterion that is satisfied when the movement of the second electronic device includes a movement of the second electronic device from a first pitch to a second pitch. Additionally or alternatively to one of more of the examples disclosed above, in some examples, the one or more second criteria include a criterion that is satisfied when the movement of the second electronic device includes a movement of the second electronic device from a first yaw position to a second yaw position. Additionally or alternatively to one of more of the examples disclosed above, in some examples, the one or more second criteria include a criterion that is satisfied when the movement of the second electronic device includes a movement of the second electronic device in a horizontal, rotational direction by more than a first threshold amount and when a movement of the electronic device includes a movement of the electronic device in the horizontal, rotational direction by less than a second threshold amount. Additionally or alternatively to one of more of the examples disclosed above, in some examples, causing the second tinting level to be applied further includes causing a transition from the first tinting level to the second tinting level, including at least applying a third tinting level between the first tinting level and the second tinting level. Additionally or alternatively to one of more of the examples disclosed above, in some examples, the one or more displays and one or more input devices are included within a second electronic device, and wherein the one or more criteria include a criterion that is satisfied in response to detecting a sound and a movement of the second electronic device towards the sound. Additionally or alternatively to one of more of the examples disclosed above, in some examples, the one or more criteria include a criterion that is satisfied when a display of the electronic device, different than the one or more displays presenting content, is turned on. Additionally or alternatively to one of more of the examples disclosed above, in some examples, the one or more criteria include a criterion that is satisfied when the electronic device detects an input using the one or more input devices. Additionally or alternatively to one of more of the examples disclosed above, in some examples, the one or more input devices includes a motion sensor and an image sensor. Additionally or alternatively to one of more of the examples disclosed above, in some examples, causing the content to be presented in the second manner comprises: causing the one or more displays to cease presenting the content in the first manner; and causing the content to be presented on the electronic device. Additionally or alternatively to one of more of the examples disclosed above, in some examples, causing the content to be presented in the second manner further comprises causing the one or more displays to minimize the content. Additionally or alternatively to one of more of the examples disclosed above, in some examples, the method further comprises determining that one or more third criteria are satisfied; and in response to determining that the one or more third criteria are satisfied: causing the one or more displays to present the content in the first manner; and causing the first tinting level to be applied to the one or more displays. Additionally or alternatively to one of more of the examples disclosed above, in some examples. the one or more second criteria include a criterion that is satisfied when the movement of the electronic device and/or the movement of the second electronic device corresponds to a user transitioning between standing up and sitting down. Additionally or alternatively to one of more of the examples disclosed above, in some examples, the one or more second criteria include a criterion that is satisfied when the movement of the electronic device and/or the movement of the second electronic device corresponds to a user walking. Additionally or alternatively to one of more of the examples disclosed above, in some examples, the method further includes detecting, via the one or more input devices, the movement of the electronic device and/or the movement of the second electronic device that exceeds a second movement threshold; and in response to detecting the movement of the electronic device and/or the movement of the second electronic device: causing the content to be presented in a third manner different than the first manner; and causing a third tinting level different than the first tinting level to be applied at the one or more displays. Additionally or alternatively to one of more of the examples disclosed above, in some examples, the method further includes detecting, via the image sensor of the electronic device, a location of the one or more displays relative to the electronic device; and in response to detecting the location of the one or more display relative to the electronic device, causing the second tinting level to be applied at a portion of the one or more displays corresponding to a location of the electronic device. Additionally or alternatively to one of more of the examples disclosed above, in some examples, causing the second tinting level to be applied at the location of the electronic device on the one or more displays includes causing a tinting gradient to be applied from a bottom of the one or more displays to the location of the electronic device on the one or more displays. Additionally or alternatively to one of more of the examples disclosed above, in some examples, the one or more criteria include a criterion that is satisfied when the electronic device is in view of the one or more displays, and the method further comprises: causing an increase in a brightness level of a display of the electronic device in response to causing a second tinting level different than the first tinting level to be applied at the one or more displays. Additionally or alternatively to one of more of the examples disclosed above, in some examples, the one or more criteria include a criterion that is satisfied when the electronic device is in view of the one or more displays, and the method further comprises: causing a modification of a color of a display of the electronic device. Some examples of the disclosure are directed to a method, comprising at an electronic device in communication with one or more first displays, one or more second displays, and one or more input devices: causing the one or more first displays to present content relative to the one or more second displays while a first tinting level is applied at the one or more first displays; while the one or more displays are presenting the content relative to the one or more second displays and while the first tinting level is applied at the one or more first displays, determining that one or more criteria are satisfied; in response to determining that the one or more criteria are satisfied: causing a second tinting level different than the first tinting level to be applied at the one or more first displays.

Additionally or alternatively to one of more of the examples disclosed above, in some examples, in response to determining that the one or more criteria are satisfied, causing the content to be presented in a second manner different than the first manner.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

The invention claimed is:

1. A method comprising:
   at an electronic device in communication with one or more displays and one or more input devices:
   causing the one or more displays to present content in a first manner while a first tinting level is applied at the one or more displays;
   while the one or more displays are presenting the content in the first manner and while the first tinting level is applied at the one or more displays, determining that one or more criteria are satisfied;
   in response to determining that the one or more criteria are satisfied:
      causing the content to be presented in a second manner different than the first manner; and
      causing a second tinting level different than the first tinting level to be applied at the one or more displays.

2. The method of claim 1, wherein:
   causing the one or more displays to present the content in the first manner further comprises causing the one or more displays to present the content at a first size, a first brightness, a first opacity, at a first location on the one or more displays, and/or according to a first anchoring scheme; and
   causing the one or more displays to present the content in the second manner further comprises causing the one or more displays to present the content at a second size smaller than the first size, a second brightness less than the first brightness, a second opacity less than the first opacity, at a second location different than the first location on the one or more displays, and/or according to a second anchoring scheme different than the first anchoring scheme.

3. The method of claim 1, wherein the second tinting level provides the one or more displays with a higher transparency level compared with the first tinting level.

4. The method of claim 1, wherein the one or more displays and the one or more input devices are included within a second electronic device, and wherein the one or more criteria include:
   a first criterion that is satisfied when a movement of the second electronic device satisfies one or more second criteria,
   a second criterion that is satisfied when the movement is greater than a threshold movement of the second electronic device,
   a third criterion that is satisfied when the movement of the second electronic device includes a movement of the second electronic device from a first pitch to a second pitch,
   a fourth criterion that is satisfied when the movement of the second electronic device includes a movement of the second electronic device from a first yaw position to a second yaw position,
   a fifth criterion that is satisfied when the movement of the second electronic device includes a movement of the second electronic device in a horizontal, rotational direction by more than a first threshold amount and when a movement of the electronic device includes a movement of the electronic device in the horizontal, rotational direction by less than a second threshold amount,
   a sixth criterion that is satisfied when the movement of the electronic device and/or the movement of the second electronic device corresponds to a user transitioning between standing up and sitting down, or a seventh criterion that is satisfied when the movement of the electronic device and/or the movement of the second electronic device corresponds to a user walking.

5. The method of claim 1, wherein the one or more displays and the one or more input devices are included within a second electronic device, and wherein the one or more criteria include a criterion that is satisfied in response to detecting a sound and a movement of the second electronic device towards the sound.

6. The method of claim 1, wherein causing the content to be presented in the second manner comprises:
causing the one or more displays to cease presenting the content in the first manner; and
causing the content to be presented on the electronic device.

7. The method of claim 1, wherein causing the content to be presented in the second manner further comprises causing the one or more displays to minimize the content.

8. The method of claim 1, wherein the one or more criteria include a criterion that is satisfied when the electronic device is in view of the one or more displays, and the method further comprises:
causing a modification of a color of a display of the electronic device.

9. An electronic device comprising:
one or more displays;
a memory;
one or more input devices;
one or more processors; and
one or more programs stored in the memory and configured to be executed by the one or more processors, the one or more programs including instructions for:
causing the one or more displays to present content in a first manner while a first tinting level is applied at the one or more displays;
while the one or more displays are presenting the content in the first manner and while the first tinting level is applied at the one or more displays, determining that one or more criteria are satisfied;
in response to determining that the one or more criteria are satisfied:
causing the content to be presented in a second manner different than the first manner; and
causing a second tinting level different than the first tinting level to be applied at the one or more displays.

10. The electronic device of claim 9, wherein:
causing the one or more displays to present the content in the first manner further comprises causing the one or more displays to present the content at a first size, a first brightness, a first opacity, at a first location on the one or more displays, and/or according to a first anchoring scheme; and
causing the one or more displays to present the content in the second manner further comprises causing the one or more displays to present the content at a second size smaller than the first size, a second brightness less than the first brightness, a second opacity less than the first opacity, at a second location different than the first location on the one or more displays, and/or according to a second anchoring scheme different than the first anchoring scheme.

11. The electronic device of claim 9, wherein the second tinting level provides the one or more displays with a higher transparency level compared with the first tinting level.

12. The electronic device of claim 9, wherein the one or more displays and one or more input devices are included within a second electronic device, and wherein the one or more criteria include a criterion that is satisfied when a movement of the second electronic device satisfies one or more second criteria.

13. The electronic device of claim 9, wherein the one or more displays and one or more input devices are included within a second electronic device, and wherein the one or more criteria include a criterion that is satisfied in response to detecting a sound and a movement of the second electronic device towards the sound.

14. The electronic device of claim 9, wherein causing the content to be presented in the second manner comprises:
causing the one or more displays to cease presenting the content in the first manner; and
causing the content to be presented on the electronic device.

15. The electronic device of claim 9, wherein causing the content to be presented in the second manner further comprises causing the one or more displays to minimize the content.

16. The electronic device of claim 9, wherein the one or more criteria include a criterion that is satisfied when the electronic device is in view of the one or more displays, and the one or more programs further including instructions for:
causing a modification of a color of a display of the electronic device.

17. A non-transitory computer readable storage medium storing one or more programs, the one or more programs comprising instructions, which when executed by one or more processors of an electronic device, cause the electronic device to perform a method comprising:
causing one or more displays in communication with the electronic device to present content in a first manner while a first tinting level is applied at the one or more displays;
while the one or more displays are presenting the content in the first manner and while the first tinting level is applied at the one or more displays, determining that one or more criteria are satisfied;
in response to determining that the one or more criteria are satisfied:
causing the content to be presented in a second manner different than the first manner; and
causing a second tinting level different than the first tinting level to be applied at the one or more displays.

18. The non-transitory computer readable storage medium of claim 17, wherein:
causing the one or more displays to present the content in the first manner further comprises causing the one or more displays to present the content at a first size, a first brightness, a first opacity, at a first location on the one or more displays, and/or according to a first anchoring scheme; and
causing the one or more displays to present the content in the second manner further comprises causing the one or more displays to present the content at a second size smaller than the first size, a second brightness less than the first brightness, a second opacity less than the first opacity, at a second location different than the first location on the one or more displays, and/or according to a second anchoring scheme different than the first anchoring scheme.

19. The non-transitory computer readable storage medium of claim 17, wherein the second tinting level provides the one or more displays with a higher transparency level compared with the first tinting level.

20. The non-transitory computer readable storage medium of claim 17, wherein the one or more displays and one or more input devices are included within a second electronic device, and wherein the one or more criteria include a criterion that is satisfied when a movement of the second electronic device satisfies one or more second criteria.

21. The non-transitory computer readable storage medium of claim 17, wherein the one or more displays and one or more input devices are included within a second electronic device, and wherein the one or more criteria include a criterion that is satisfied in response to detecting a sound and a movement of the second electronic device towards the sound.

22. The non-transitory computer readable storage medium of claim 17, wherein causing the content to be presented in the second manner comprises:
   causing the one or more displays to cease presenting the content in the first manner; and
   causing the content to be presented on the electronic device.

23. The non-transitory computer readable storage medium of claim 17, wherein causing the content to be presented in the second manner further comprises causing the one or more displays to minimize the content.

24. The non-transitory computer readable storage medium of claim 17, wherein the one or more criteria include a criterion that is satisfied when the electronic device is in view of the one or more displays, and the method further comprises:
   modifying a color of a display of the electronic device.

* * * * *